United States Patent
Pelletier et al.

(10) Patent No.: US 12,206,565 B2
(45) Date of Patent: *Jan. 21, 2025

(54) CONNECTIVITY ROBUSTNESS IN WIRELESS SYSTEMS

(71) Applicant: InterDigital Patent Holdings, Inc., Wilmington, DE (US)

(72) Inventors: Ghyslain Pelletier, Montreal (CA); Paul Marinier, Brossard (CA); Diana Pani, Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/425,576

(22) Filed: Jan. 29, 2024

(65) Prior Publication Data

US 2024/0171489 A1    May 23, 2024

Related U.S. Application Data

(63) Continuation of application No. 18/183,352, filed on Mar. 14, 2023, now Pat. No. 11,924,075, which is a
(Continued)

(51) Int. Cl.
*H04W 72/21* (2023.01)
*H04L 5/00* (2006.01)
(Continued)

(52) U.S. Cl.
CPC ........ *H04L 43/0811* (2013.01); *H04L 5/0098* (2013.01); *H04W 72/21* (2023.01);
(Continued)

(58) Field of Classification Search
None
See application file for complete search history.

(56) References Cited

U.S. PATENT DOCUMENTS

| 9,271,290 B2 | 2/2016 | Pelletier |
| 2004/0156328 A1 | 8/2004 | Walton |

(Continued)

FOREIGN PATENT DOCUMENTS

| CN | 101999249 A | 3/2011 |
| CN | 102223689 A | 10/2011 |

(Continued)

OTHER PUBLICATIONS

Third Generation Partnership Project (3GPP), "Introduction of CA Enhancements in MAC", 3GPP TSG-RAN2 Meeting #79; Ericsson; Qingdao, R2-124361, China, Aug. 13-17, 2012, 14 pages.
(Continued)

*Primary Examiner* — Angela Nguyen
(74) *Attorney, Agent, or Firm* — Flaster Greenbeg, P.C.

(57) ABSTRACT

Systems and methods are contemplated for reconfiguration of one or more MAC instances while the WTRU is operating using dual- or multi-MAC instance connectivity. For example, upon reception of RRC reconfiguration information that modifies one or more secondary MAC instances, the WTRU may transmit a reconfiguration complete message to a Macro eNB (MeNB) and may synchronize to small-cell or secondary eNB (SeNB), for example if triggered by one or more of an RRC flag, a physical downlink control channel (PDCCH) order (MeNB/SeNB), MAC activation information, etc. For example, the WTRU may synchronize to the SeNB for specific type(s) of RRC reconfigurations, but not other type(s) of RRC reconfigurations. Although examples may be described in terms of dual connectivity, the WTRU may establish connectivity and perform mobility procedures with more than two radio access network (RAN) nodes (e.g., eNBs), and the embodiments described may be equally applicable to those scenarios.

20 Claims, 8 Drawing Sheets

Related U.S. Application Data continuation of application No. 17/362,211, filed on Jun. 29, 2021, now Pat. No. 11,637,763, which is a continuation of application No. 15/954,938, filed on Apr. 17, 2018, now Pat. No. 11,095,541, which is a continuation of application No. 15/033,619, filed as application No. PCT/US2014/063263 on Oct. 30, 2014, now Pat. No. 9,973,404.

(60) Provisional application No. 61/937,990, filed on Feb. 10, 2014, provisional application No. 61/897,550, filed on Oct. 30, 2013.

(51) Int. Cl.
| | | |
|---|---|---|
| *H04L 43/0811* | (2022.01) | |
| *H04W 74/0833* | (2024.01) | |
| *H04W 76/15* | (2018.01) | |
| *H04L 101/622* | (2022.01) | |
| *H04W 36/00* | (2009.01) | |
| *H04W 76/20* | (2018.01) | |

(52) U.S. Cl.
CPC ......... *H04W 74/0833* (2013.01); *H04L 5/001* (2013.01); *H04L 2101/622* (2022.05); *H04W 36/00692* (2023.05); *H04W 76/15* (2018.02); *H04W 76/20* (2018.02)

(56) References Cited

U.S. PATENT DOCUMENTS

| | | | |
|---|---|---|---|
| 2008/0188220 | A1 | 8/2008 | DiGirolamo |
| 2009/0046641 | A1 | 2/2009 | Wang |
| 2009/0135771 | A1 | 5/2009 | Pani |
| 2009/0316586 | A1 | 12/2009 | Yi |
| 2010/0074203 | A1 | 3/2010 | Pani |
| 2011/0002262 | A1 | 1/2011 | Wang |
| 2011/0199905 | A1 | 8/2011 | Pinheiro |
| 2011/0261763 | A1 | 10/2011 | Chun |
| 2012/0040677 | A1 | 2/2012 | Chen |
| 2012/0140743 | A1 | 6/2012 | Pelletier |
| 2013/0023269 | A1 | 1/2013 | Wang |
| 2013/0039202 | A1 | 2/2013 | Feuersanger |
| 2013/0070682 | A1 | 3/2013 | Kim et al. |
| 2013/0114516 | A1 | 5/2013 | Koo |
| 2013/0215772 | A1 | 8/2013 | Kaur |
| 2013/0294283 | A1 | 11/2013 | Van |
| 2015/0181470 | A1 | 6/2015 | Chai |
| 2015/0271836 | A1 | 9/2015 | Damnjanovic et al. |
| 2016/0242193 | A1 | 8/2016 | Hong et al. |
| 2016/0255619 | A1 | 9/2016 | Yi |
| 2016/0285716 | A1 | 9/2016 | Pelletier et al. |
| 2016/0373962 | A1 | 12/2016 | Wang |

FOREIGN PATENT DOCUMENTS

| | | |
|---|---|---|
| CN | 102395156 A | 3/2012 |
| CN | 102939729 A | 2/2013 |
| CN | 103238368 A | 8/2013 |
| EP | 2369795 A2 | 9/2011 |
| JP | 2002064848 A | 2/2002 |
| JP | 2013181611 A | 9/2013 |
| JP | 2015-50665 A | 3/2015 |
| JP | 2017500829 A | 1/2017 |
| KR | 20130143098 A | 12/2013 |
| RU | 2464741 C1 | 10/2012 |
| RU | 2476014 C2 | 2/2013 |
| WO | 2009088858 A1 | 7/2009 |
| WO | 2013139305 A1 | 9/2013 |

OTHER PUBLICATIONS

Third Generation Partnership Project (3GPP), R2-124366, "Introduction of Carrier aggregation enhancements", 3GPP TSG-RAN2 Meeting #79; Nokia Corporation, Nokia Siemens Networks; Qingdao, China, Aug. 13-17, 2012, 17 pages.

Third Generation Partnership Project (3GPP), R2-131164, "Study of Solutions and Radio Protocol Architecture for Dual-Connectivity", Huawei, HiSilicon 3GPP TSG-RAN WG2 Meeting 81bis, Apr. 2013.

Third Generation Partnership Project (3GPP), R2-131798, "Considering on PDCP in Multiflow", Pantech, 3GPP TSG-RAN WG2 Meeting #82, Fukuoka, Japan, May 20-24, 2013, pp. 1-5.

Third Generation Partnership Project (3GPP), R2-131939, "User Plane Architecture for Dual-Connectivity", InterDigital Communications, 3GPP TSG-RAN WG2#82, May 11, 2013, 7 Pages.

Third Generation Partnership Project (3GPP), R2-132718, "Control Plane Aspects with Dual Connectivity for Small Cell Deployments", InterDigital Communications, 3GPP TSG-RAN WG2 #83, Barcelona, Spain, Aug. 19-23, 2013, pp. 1-4.

Third Generation Partnership Project (3GPP), R2-132860, "Challenges in the Uplink to Support Dual Connectivity", Intel Corporation, 3GPP TSG RAN WG2 Meeting #83, Barcelona, Spain, Aug. 19-23, 2013, pp. 1-7.

Third Generation Partnership Project (3GPP), R2-133236, "MAC Aspects of Dual Connectivity", 3GPP TSG-RAN WG2 #83bis; InterDigital Communications; Ljubljana, Slovenia, Oct. 7-11, 2013, 5 pages.

Third Generation Partnership Project (3GPP), R2-133334, "U-plan Architecture Alternatives for RRC Message Transmission", 3GPP TSG RAN WG2 Meeting #83bis; Blackberry UK Limited; Ljubljana, Slovenia, Oct. 7-11, 2013, 6 pages.

Third Generation Partnership Project (3GPP), R2-133375, "Some considerations on U-Plane Alternative 3C", 3GPP TSG RAN WG2 Meeting #83bis; CATT; Ljubljana, Slovenia, Oct. 7-11, 2013, 2 pages.

Third Generation Partnership Project (3GPP), R2-133419, "Overall Procedures for Offloading over Xn", Ericsson, 3GPP TSG-RAN WG2 Meeting #83bis, Ljubljana, Slovenia, Oct. 7-11, 2013, pp. 1-9.

Third Generation Partnership Project (3GPP), R2-133496, "MAC layer aspects for dual connectivity", 3GPP TSG RAN WG2 Meeting #83bis; Intel Corporation; Ljubljana, Slovenia, Oct. 7-11, 2013, 3 pages.

Third Generation Partnership Project (3GPP), R2-133498, "Radio Link Failure Handling for Dual Connectivity", Intel Corporation, 3GPP TSG RAN WG2 Meeting #83bis, Ljubljana, Slovenia, Oct. 7-11, 2013, pp. 1-4.

Third Generation Partnership Project (3GPP), Tdoc R2-130515, "Dual Connectivity for Small Cell Deployments", InterDigital Communications, 3GPP TSG-RAN WG2 #81, Malta, MT, Jan. 28-Feb. 1, 2013, 4 pages.

Third Generation Partnership Project (3GPP), Technical Specification Group Radio Access Network, Evolved Universal Radio Access (E-UTRA), "Study on Small Cell Enhancements for E-UTRA and E-UTRAN—Higher Layer Aspects" (Release 12), TR 36.842 V0.2.1, Aug. 2013, pp. 1-51.

Third Generation Partnership Project (3GPP); TR 36.842 V0.4.0, "Evolved Universal Terrestrial Radio Access (E-UTRA), Study on Small Cell Enhancements for E-UTRA and E-UTRAN—Higher Layer Aspects (Release 12)", Technical Specification Group Radio Access Network, Oct. 2013, 52 pages.

Third Generation Partnership Project (3GPP), Technical Specification Group Radio Access Network, Evolved Universal Terrestrial Radio Access (E-UTRA) and Evolved Universal Terrestrial Radio Access Network (E-UTRAN), "Overall Description", Stage 2 (Release 11), TS 36.300 V11.7.0, Sep. 2013, 222 pages.

Third Generation Partnership Project (3GPP), Technical Specification Group Radio Access Network, Evolved Universal Terrestrial Radio Access (E-UTRA), Medium Access Control (MAC) "Protocol Specification" (Release 11), TS 36.321 V11.3.0, Jun. 2013, pp. 1-57.

Third Generation Partnership Project (3GPP), Technical Specification Group Radio Access Network, Evolved Universal Terrestrial

(56) References Cited

OTHER PUBLICATIONS

Radio Access (E-UTRA), Radio Resource Control (RRC), "Protocol Specification" (Release 11), TS 36.331 V11.5.0, Sep. 2013, pp. 1-347.
Third Generation Partnership Project (3GPP), Technical Specification Group Radio Access Network, Evolved Universal Terrestrial Radio Access (E-UTRA) and Evolved Packet Core (EPC), "User Equipment (UE) Conformance Specification, Part 1: Protocol Conformance Specification" (Release 11), TS 36.523-1 V11.4.0, Sep. 2013, 357 pages.
Third Generation Partnership Project (3GPP), "Protocol architecture for dual connectivity", 3GPP TSG-RAN WG2 Meeting #81bis Chicago, R2-131174, Renesas Mobile Europe, Apr 15-Apr. 19, 2013, 8 pages.

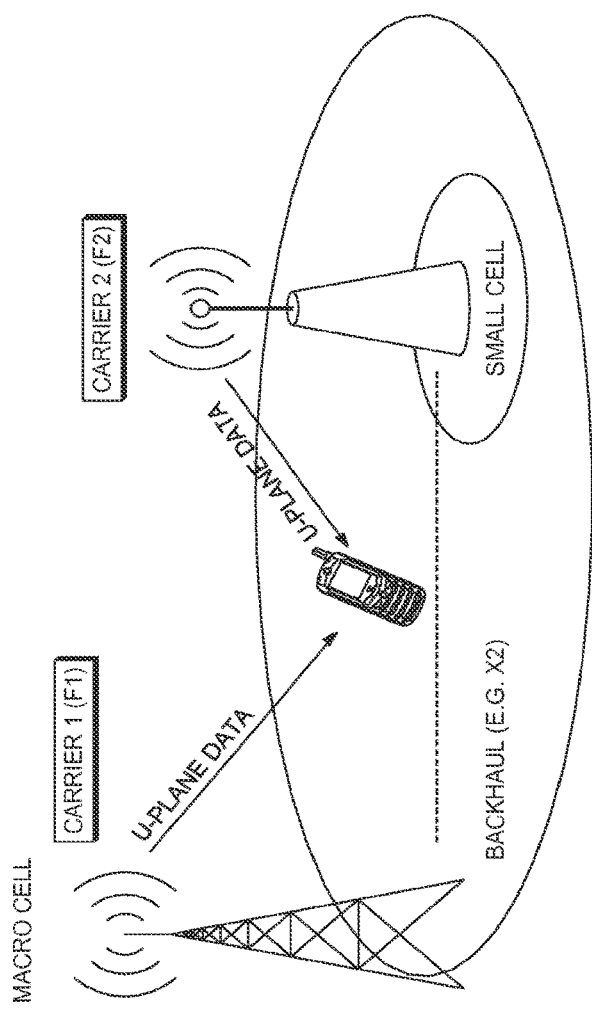
FIG. 2
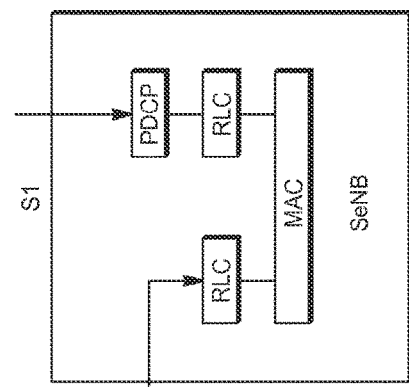
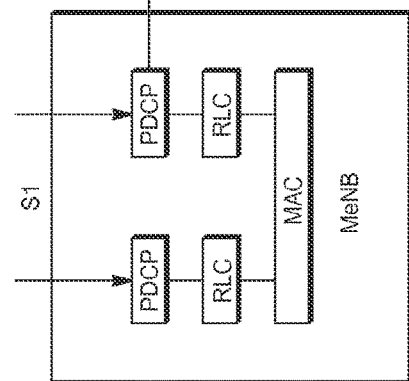
FIG. 3

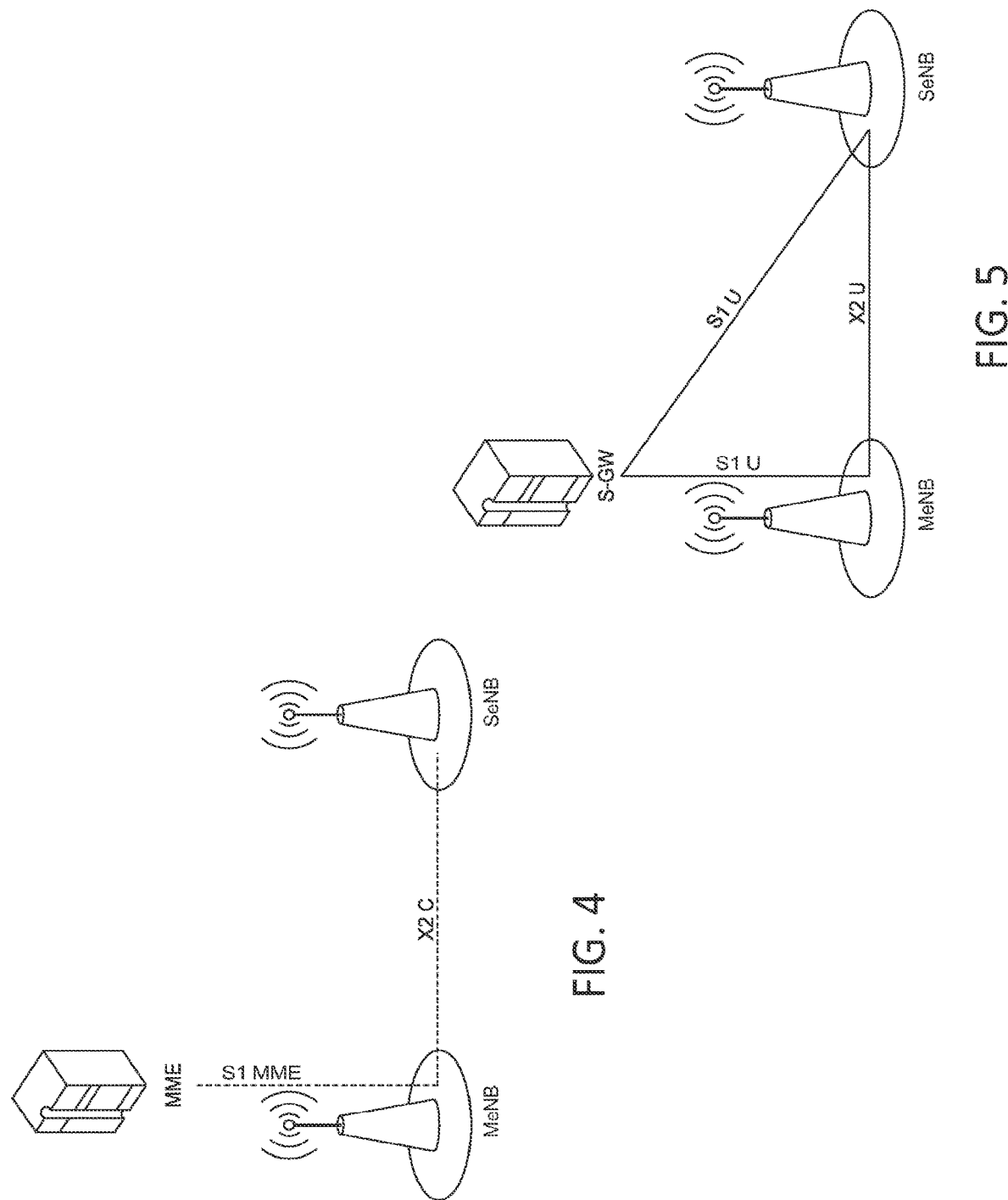

CONNECTIVITY ROBUSTNESS IN WIRELESS SYSTEMS

CROSS-REFERENCE TO RELATED APPLICATIONS

This application is a continuation of U.S. Non-Provisional application Ser. No. 18/183,352, filed Mar. 14, 2023, which is a continuation of U.S. Non-Provisional application Ser. No. 17/362,211, filed Jun. 29, 2021, which issued as U.S. Pat. No. 11,637,763 on Apr. 25, 2023, which is a continuation of U.S. Non-Provisional application Ser. No. 15/954,938, filed Apr. 17, 2018, which issued as U.S. Pat. No. 11,095,541 on Aug. 17, 2021, which is a continuation of U.S. Non-Provisional application Ser. No. 15/033,619, filed Apr. 29, 2016, which issued as U.S. Pat. No. 9,973,404 on May 15, 2018, which is the National Stage Entry under 35 U.S.C. § 371 of Patent Cooperation Treaty Application PCT/US2014/063263, titled "Connectivity Robustness in Wireless Systems", filed Oct. 30, 2014, which claims the benefit of U.S. Provisional Application No. 61/897,550, titled "Methods for Connectivity Robustness in Wireless Systems", filed Oct. 30, 2013, and U.S. Provisional Application No. 61/937,990, titled "Methods for Connectivity Robustness in Wireless Systems", filed Feb. 10, 2014, the contents of all of which are incorporated by reference as if fully set-forth herein in their respective entirety, for all purposes.

BACKGROUND

In LTE R8 (e.g., single cell operation), a wireless transmit receive unit (WTRU) may be configured to receive (Layer 3)/Radio Resource Control (RRC) signaling that reconfigures one or more aspects of the WTRU configuration. For example, the RRC message may include reconfiguration of one or more of Layer 1 (L1)/Physical (PHY) Layer parameter(s) and/or Layer 2 (L2) parameter(s) (e.g., Medium Access Control (MAC), Radio Link Control (RLC), and/or Packet Data Convergence Protocol (PDCP)). Such reconfiguration may include the mobility control element such that a handover procedure may be triggered. Such reconfiguration procedures may be redundant and/or uncoordinated when a WTRU is operating while connected to multiple evolved Node B (eNBs), for example if each eNB independently schedules its own transmissions and/or configures its own L1/L2/L3 parameters.

SUMMARY

The Summary is provided to introduce a selection of concepts in a simplified form that are further described below in the Detailed Description. This Summary is not intended to identify key features and/or essential features of the claimed subject matter, nor is it intended to be used to limit the scope of the claimed subject matter.

Systems and methods are discloses for configuration/reconfiguration of one or more MAC instances while the WTRU is operating using dual- or multi-MAC instance connectivity. For example, upon reception of RRC reconfiguration information that modifies one or more secondary MAC instances, the WTRU may transmit a reconfiguration complete message to a Macro eNB (MeNB) and may synchronize to one or more cells that may be associated with a secondary eNB (SeNB), for example if triggered by one or more of a RRC PDU format, an RRC flag, a physical downlink control channel (PDCCH) (e.g., from a MeNB/SeNB), MAC activation information, and/or the like. In an example, the WTRU may synchronize to the SeNB for specific type(s) of RRC reconfigurations, but not other type(s) of RRC reconfigurations. Although example may be described in terms of dual connectivity, the WTRU may establish connectivity and perform mobility procedures with more than two radio access network (RAN) nodes (e.g., eNBs), and the methods and systems described may be equally applicable to those scenarios.

For example, methods and systems are disclosed for reconfiguring one or more radio interfaces in a wireless transmit receive unit (WTRU) configured for dual connectivity (e.g., and/or multi-node connectivity). The WTRU may receive a radio resource control (RRC) connection reconfiguration message including a new configuration for one or more radio interfaces. The RRC connection reconfiguration message may be received over one of the radio interfaces. The WTRU may determine whether the new configuration can be applied either in whole or in part. For example, the WTRU may be able to apply a new configuration to one radio interface, but not to a different radio interface. The WTRU may transmit a response to the RRC connection reconfiguration message over the radio interface over which the RRC connection reconfiguration was received. The response may indicate whether the new configuration can be applied either in whole or in part. The WTRU may indicate the outcome of the reconfiguration over a different radio interface than was used for transmission of the RRC connection reconfiguration message, for example to inform the other RAN node to which the WTRU is connected the outcome of the RRC procedure (e.g. reconfiguration). Such an indication may be referred to as performing a synchronization procedure over the different radio interface.

For example, synchronization may include performing one or more of a random access procedure, a sounding reference signal (SRS) transmission, or a dedicated scheduling request (D-SR) procedure of the different radio interface than was used for transmission of the RRC connection reconfiguration message and the response to the RRC connection reconfiguration message. The random access procedure, a SRS transmission, or D-SR procedure may indicate the outcome of the reconfiguration and confirm that the WTRU is able to successfully transmit and/or receive over the reconfigured interface.

Each of the radio interfaces may be a Uu interface of the WTRU. Each of the radio interfaces may be associated with a respective Medium Access Control (MAC) instance. For example, the radio interface used for transmission of the RRC connection reconfiguration message may be associated with a macro evolved Node B (MeNB) and a primary MAC instance. The different radio interface may be associated with a secondary evolved Node B (SeNB) and a secondary MAC instance. Signaling radio bearers (SRBs) for the WTRU may be terminated at an RRC instance located at the MeNB.

For example, the WTRU may be triggered to indicate the outcome of the reconfiguration based on one or more of receiving an indication in a physical downlink control channel (PDCCH) transmission, receiving an indication in the RRC connection reconfiguration message, or receiving an indication in a Medium Access Control (MAC) control element (CE). The WTRU may be triggered to indicate the outcome of the reconfiguration based on one or more of the type of L3 procedure or the impact of the L3 procedure triggered by the RRC connection reconfiguration message. For example, the impact of the L3 procedure that triggers the WTRU to indicate the outcome of the reconfiguration may be reconfiguration of the different radio interface. The WTRU may be triggered to request bearer mobility from a secondary MAC instance to a primary MAC instance, perhaps for example when the outcome of a reconfiguration procedure may be that the WTRU is unable to apply an updated configuration to the different radio interface and/or the different radio interface is associated with a secondary Medium Access Control (MAC) instance, among other scenarios. Bearer mobility from the secondary MAC instance to the primary MAC instance may also be triggered based on the occurrence of radio link failure on the radio interface associated with secondary MAC instance. The WTRU may revert to an old configuration for the secondary MAC instance based on failure of the reconfiguration procedure.

The WTRU may be configured to select a L2 path to use for a given RRC procedure as a function of the type of RRC procedure to be performed, perhaps for example if multi-flow is used for the control plane (CP), among other scenarios. The WTRU may indicate the outcome and/or result of the RRC procedure to a SeNB using a synchronization procedure while transmitting an RRC response (e.g., success/failure) to MeNB via its associated Uu interface, perhaps for example if the CP is established over the L2 path including the MeNB, but perhaps in some embodiments not for the L2 path including the SeNB, among other scenarios.

Further, systems and methods are described for performing synchronization procedure(s) using one or more of a random access channel (RACH), sounding reference signals (SRS), dedicated scheduling requests (D-SR), and/or the like. Systems and methods are described for failure handling of RRC procedures applicable to a secondary MAC instance. Systems and methods are described for sending notifications to a MeNB and bearer re-establishment requests, for performing security and re-keying upon bearer mobility (e.g., SeNB to MeNB bearer mobility, SeNB to SeNB, etc.), for D-SR/RACH failure on a secondary MAC instance, for counter-check procedures across multiple eNBs, for L2 transport of L2 control information in case of DL, but not UL, multi-flow, and/or for the like. Methods are provided for performing fallback to a given MAC instance (e.g., a primary MAC instance) during period of unavailability (e.g., RLF) on a secondary MAC instance. Data associated with a radio bearer mapped to the secondary MAC instance for which RLF was detected may be remapped to one or more other MAC instances such as the primary MAC instance.

Embodiments contemplate one or more techniques for a wireless transmit receive unit (WTRU) that may be configured for communication via a first medium access control (MAC) instance and a second MAC instance. One or more techniques may include receiving a radio resource control (RRC) connection reconfiguration message that may include a reconfiguration for the second MAC instance. The second MAC instance may include an association with a first serving cell. The reconfiguration may include mobility control information for associating the second MAC instance with a second serving cell. One or more techniques may include determining if random access channel (RACH) information is present or absent in the mobility control information for associating the second MAC instance with a second serving cell. One or more techniques may include performing a RACH procedure on the second serving cell based on either the presence or the absence of the RACH information in the mobility control information for associating the second MAC instance with the second serving cell. One or more techniques may include associating the second serving cell with the second MAC instance based on a response to the RACH procedure.

Embodiments contemplate one or more techniques for a wireless transmit receive unit (WTRU), where the WTRU may be configured for communication via a first medium access control (MAC) instance. One or more techniques may include receiving a radio resource control (RRC) connection reconfiguration message that may include a reconfiguration to add a second MAC instance. The second MAC instance may include an association with a serving cell. The reconfiguration may include mobility control information for associating the second MAC instance with the serving cell. One or more techniques may include determining if random access channel (RACH) information is present or absent in the mobility control information for associating the second MAC instance with the serving cell. One or more techniques may include performing a RACH procedure on the serving cell based on either the presence or the absence of the RACH information in the mobility control information for associating the second MAC instance with the serving cell. One or more techniques may include establishing the second MAC instance with the serving cell based on a response to the RACH procedure.

Embodiments contemplate that a wireless transmit/receive unit (WTRU) may comprise a processor, which may be configured to receive a configuration for a first medium access control (MAC) instance and a second MAC instance. The processor may be configured to map a first radio link control (RLC) entity for a data radio bearer (DRB) to the first MAC instance (e.g., a first RLC/MAC instance) based on the configuration. The processor may be configured to map a second RLC entity for the DRB to the second MAC instance (e.g., a second RLC/MAC instance) based on the configuration. The processor may be configured to instruct a packet data convergence protocol (PDCP) entity to direct one or more PDCP protocol data units (PDUs) to at least one of the first RLC/MAC instance or the second RLC/MAC instance for an uplink transmission based on the configuration.

Embodiments contemplate one or more techniques for a wireless transmit receive unit (WTRU), where the WTRU may be configured for communication via a first medium access control (MAC) instance and a second MAC instance. One or more techniques may include receiving a radio resource control (RRC) connection reconfiguration message that may include a reconfiguration for the second MAC instance. One or more techniques may include implementing at least a part of the reconfiguration for the second MAC instance. One or more techniques may include determining that the implementation of the at least part of the reconfiguration for the second MAC instance failed. One or more techniques may include sending a notification of a failure of the reconfiguration for the second MAC instance.

BRIEF DESCRIPTION OF THE DRAWINGS

The following detailed description of example embodiments is provided with reference to the appended drawings. For the purposes of illustration, the drawings show example embodiments. The contemplated subject matter is not limited to the specific elements and/or instrumentalities described or illustrated. And absent specific notation to the contrary, no subject matter is contemplated as necessary and/or essential. In addition, the described embodiments may be employed in any combination, in whole or in part. In the drawings:

FIG. 2 is a system diagram of an example of dual connectivity, consistent with embodiments.

FIG. 3 is a diagram of an example protocol hierarchy used for dual connectivity, consistent with embodiments.

FIG. 4 is a system diagram of an example of an establishment of dual connectivity, consistent with embodiments.

FIG. 5 is a system diagram of an example of an establishment of dual connectivity, consistent with embodiments.

DETAILED DESCRIPTION OF ILLUSTRATIVE EMBODIMENTS

A detailed description of example embodiments will now be described with reference to the various Figures. Although this description provides a detailed example of possible implementations, it should be noted that the details are intended to be examples and in no way limit the scope of the application. As used herein, the article "a" or "an", absent further qualification or characterization, may be understood to mean "one or more" or "at least one", for example. Also, as used herein, the phrase user equipment (UE) may be understood to mean the same thing as the phrase wireless transmit/receive unit (WTRU).

Figure 1A:
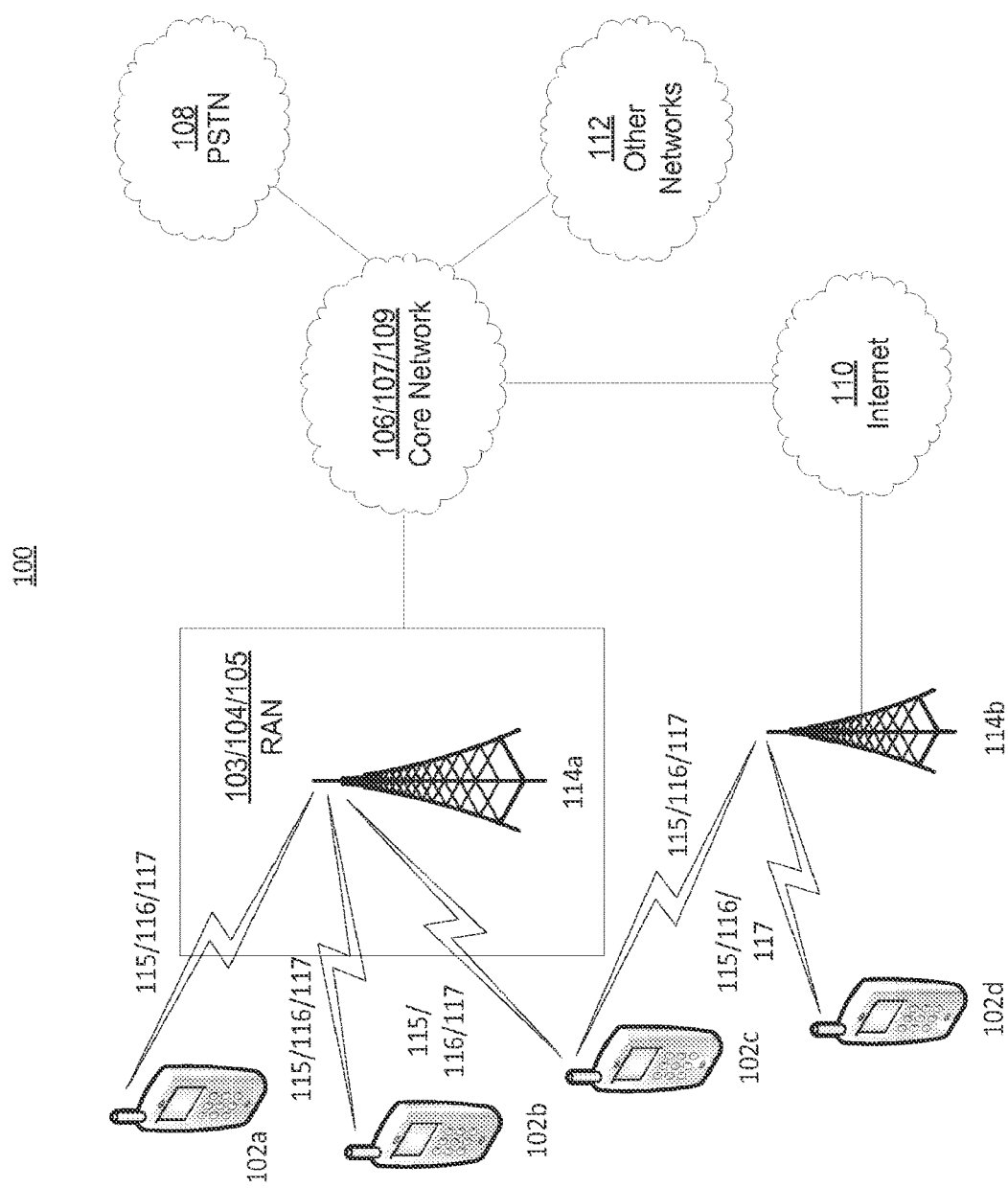
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
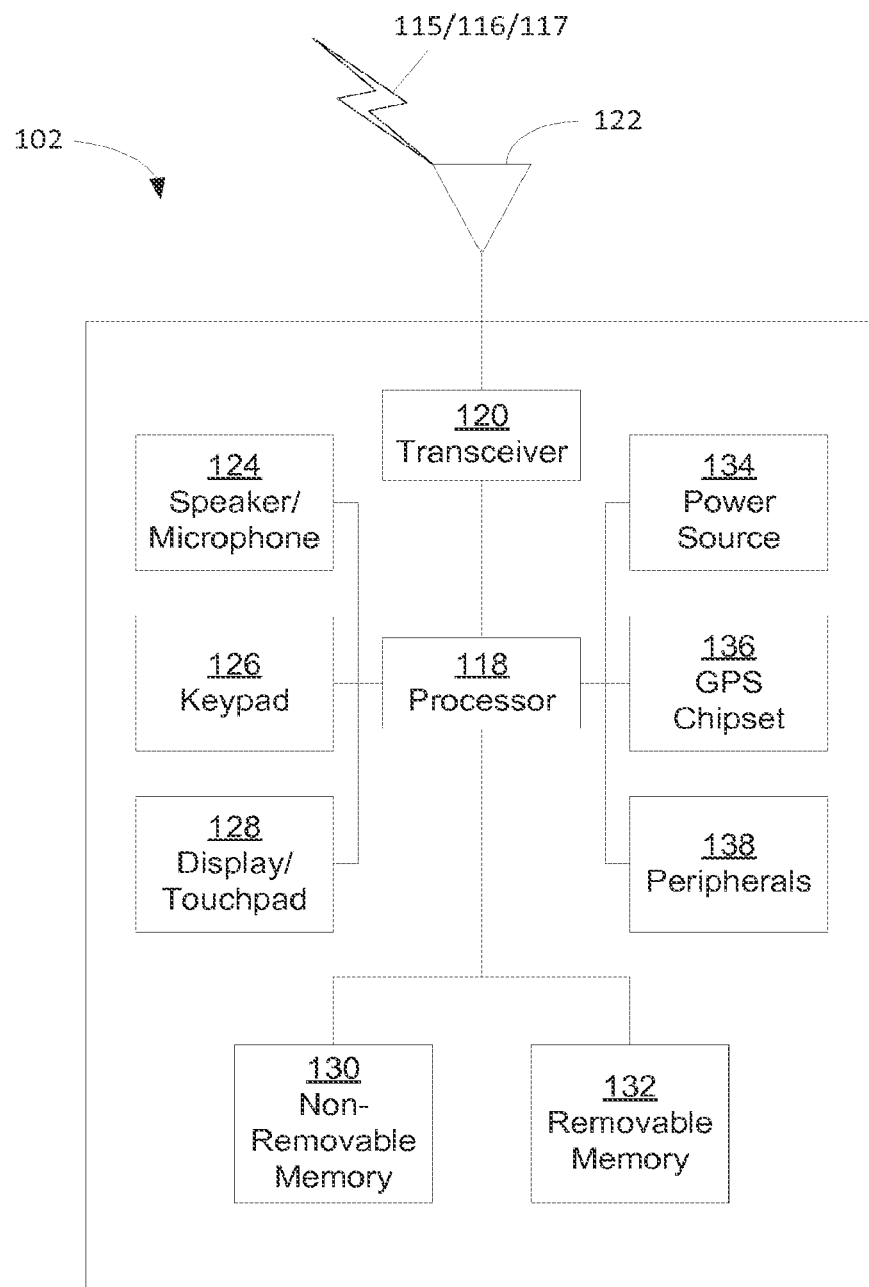
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
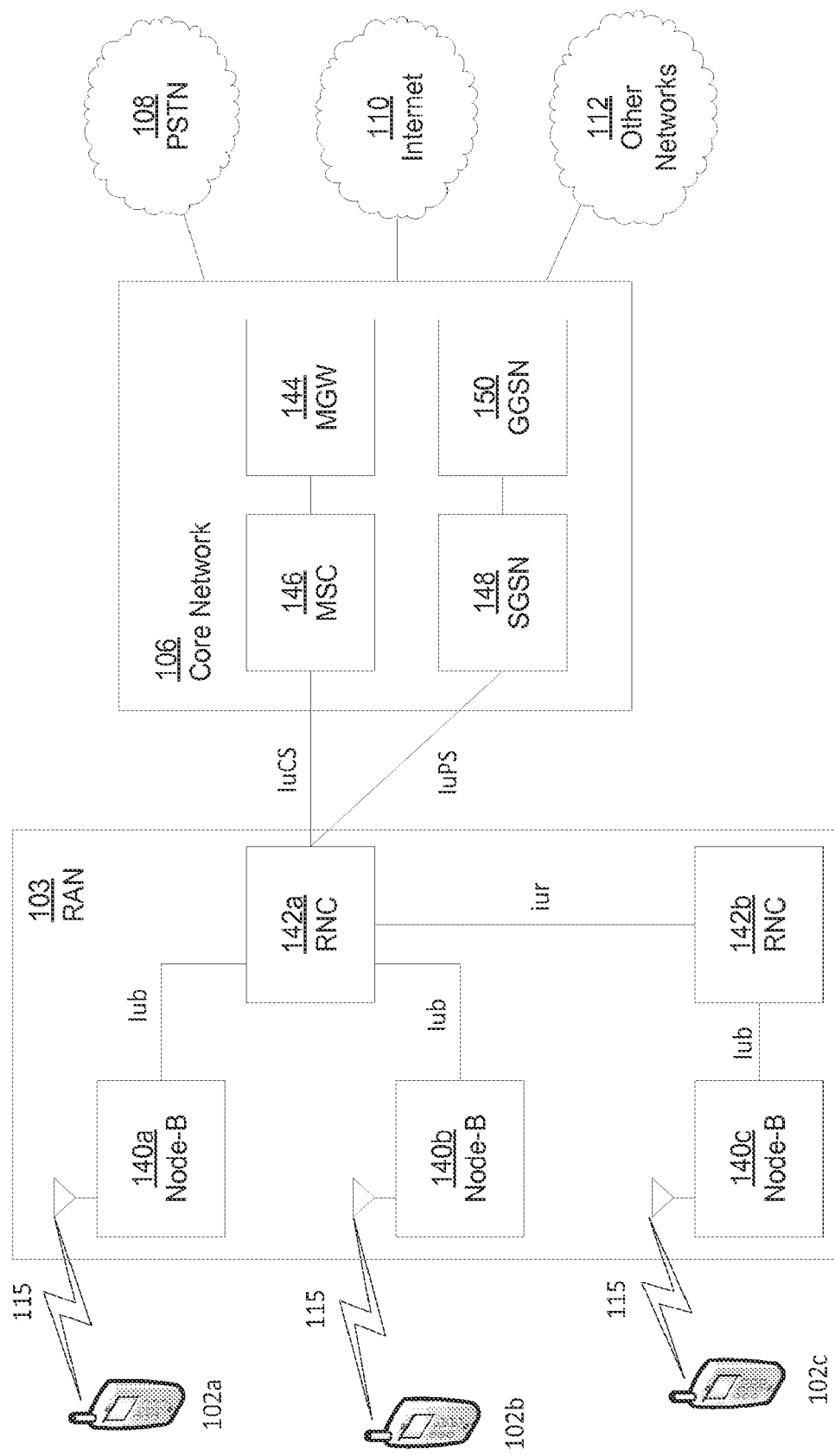
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
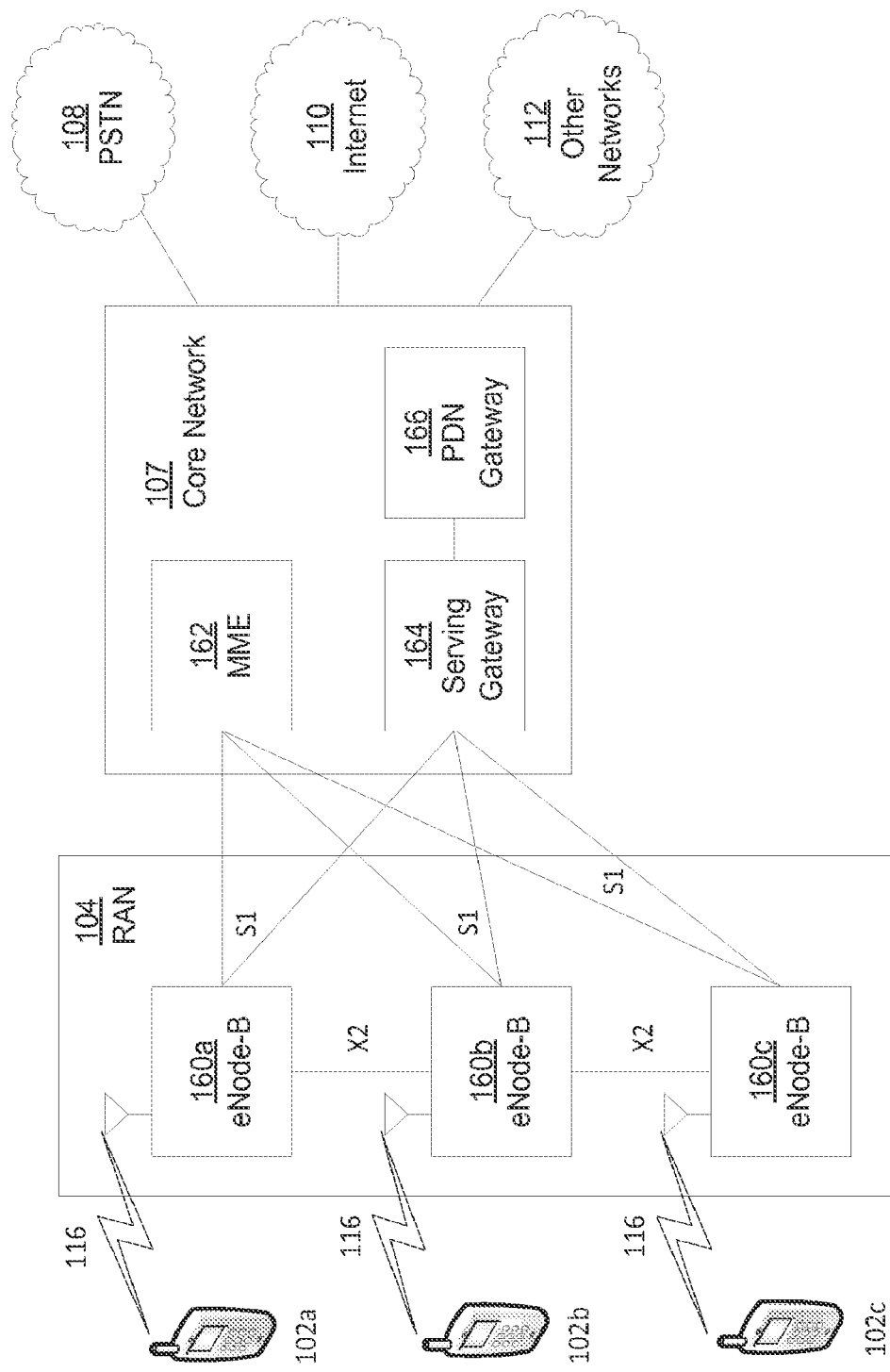
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160*a*, 160*b*, 160*c* may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 1E:
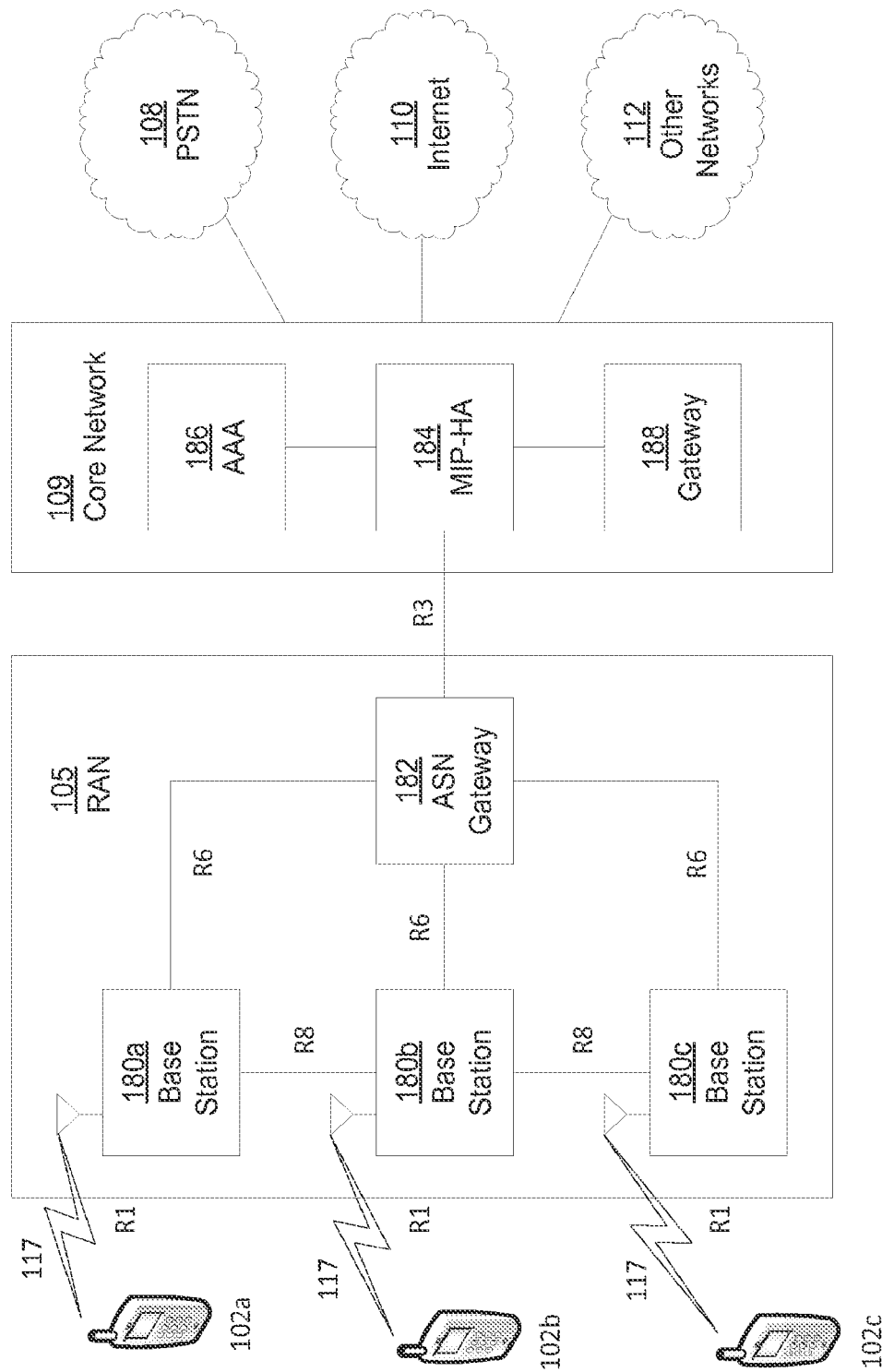
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102*a*, 102*b*, 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 1E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102b, 102c between the RAN 105 and the other ASNs. The communication link between the core network 109 and the other core networks may be defined as an R5 reference, which may include protocols for facilitating interworking between home core networks and visited core networks.

While the methods and systems described in this document (e.g., including general principles, methods and related embodiments) may be described based on the 3GPP LTE technology and related specifications, the methods and systems described herein may be equally applicable to any wireless technology implementing methods for accessing multiple wireless layers and/or for connecting to multiple radio access technologies, such as other 3GPP technology based on Wifi, WCDMA, HSPA, HSUPA, HSDPA, and/or the like.

In LTE R10 intra-eNB multi-cell operation (e.g., intra-eNB carrier aggregation), was introduced. RRC configuration messages may be used to reconfigure parameters associated to WTRU operation at multiple cells (e.g., a Primary Cell (PCell and/or zero or more Secondary Cells (SCells)). For example, RRC reconfiguration signaling may be used to add, modify, and/or remove one or more configured parameters for one or more SCell(s).

FIG. 2 illustrates an example system diagram of a WTRU in a dual connectivity relationship with a macro node (e.g., a MeNB) and a small cell (e.g., a SeNB). FIG. 3 illustrates an example protocol hierarchy of the MeNB and the SeNB in a dual connectivity scenario.

The WTRU may prepare an RRC message (e.g., an RRC Connection Reconfiguration Complete message) and/or may send the RRC message to the eNB to indicate that a reconfiguration procedure was successful, perhaps for example upon a successful completion of the one or more RRC procedures that may reconfigure one or more cells. The message may indicate that the WTRU successfully applied the configuration as signaled by the reconfiguration message that triggered the procedure. The WTRU may submit the RRC Connection Reconfiguration Complete message to the appropriate Signaling Radio Bearer (SRB) for transmission to the eNB, perhaps for example once the WTRU may have prepared the RRC Connection Reconfiguration Complete message.

FIG. 4 and FIG. 5 illustrate example system diagrams of a network node (e.g., a MME and/or a S-GW) establishing dual connectivity with a MeNB and a SeNB.

The WTRU may maintain the configuration that was in use prior to the reception of the reconfiguration signaling, perhaps for example if the WTRU cannot perform the RRC Connection Reconfiguration procedure successfully, among other scenarios. The WTRU may initiate an RRC Connection Re-establishment procedure with the re-establishment cause set to reconfiguration failure.

The transmission of the RRC Connection Reconfiguration Complete message and/or the RRC Connection Re-establishment message may indicate that the WTRU may still be able to communicate over the radio air interface, perhaps either using the new (e.g. updated) configuration or the old configuration, respectively. The WTRU may synchronize its uplink transmission timing and/or set the proper transmit power (e.g., perhaps during synchronization), perhaps for example if the WTRU may perform a random access procedure (e.g., for the scheduling request), among other scenarios.

The WTRU may trigger a scheduling request (SR), for example when data may become available for transmission for the SRB, among other scenarios. The SR may be performed using a dedicated physical uplink control channel (PUCCH) resource (e.g., D-SR), for example if such is configured and/or available, and/or using the random access channel (e.g., RACH, using RA-SR).

In LTE R12 (or later, for aspects of multi-cell operation using inter-eNB carrier aggregation), the WTRU may be configured with some form of dual- and/or multi-cell connectivity. For example, the WTRU may be configured to connect to multiple cells that are served by different eNBs and/or that may be independently scheduled (e.g., associated with distinct MAC instances). The WTRU may be configured such that the WTRU may have access to resources of cells associated to the different eNBs. The network may control connectivity using a single MME/S1-c connection terminating in the MeNB, for example.

From the perspective of the control plane, the WTRU may have established a RRC connection with a first eNB (e.g., a MeNB). In some embodiments, the WTRU may additionally support a configuration where one or more cells may be associated to a second eNB (e.g., a SeNB). The complete message may be received by the RRC entity in the MeNB, perhaps for example if the RRC connection terminates in the MeNB. From the perspective of the user plane architecture, the network may terminate S1-u in the MeNB (e.g., the MeNB alone, for one or more, or all, EPS bearers) and/or it may (e.g., additionally) terminate S1-u in the SeNB (e.g., for one or more, or all, EPS bearers).

From the perspective of the L2 transport of SRB data and/or user plane traffic, data for a given radio bearer may be transmitted from the network to the WTRU using a single L2 path (e.g., single MAC instance) and/or using either L2 path (e.g., hereafter referred to as DL multi-flow). Uplink data may be transmitted from the WTRU to the network using a single L2 path and/or using either L2 path (e.g., hereafter referred to as UL multi-flow). The WTRU may have a primary MAC instance associated to the MeNB and a secondary MAC instance associated to a SeNB.

The terms "primary MAC instance" and "secondary MAC instance" herein may refer either to MAC instances as separate processes, where each may be conceptually associated to cells of different eNBs (e.g., a MeNB and a SeNB) and/or to a single MAC instance which may make the distinction between a Uu (L1/PHY) conceptually associated to a first eNB (e.g., a MeNB) and to a second eNB (e.g., a SeNB).

The Primary MAC instance may correspond to the MAC instance that is configured with the PCell on which the WTRU established the RRC connection (e.g., similar to the legacy R10 definition of the PCell). The secondary MAC instance may be configured with a cell that performs one or more functions substantially similar to a PCell (and/or a subset of such functions), such as for example access to dedicated PUCCH resources.

Some form of inter-eNB coordination may be performed in the access network, perhaps for example when the WTRU operates with a L1/L2 connection to multiple eNBs. Such inter-eNB coordination may impact a number of WTRU L1, L2, and/or L3 procedures. For example, during the performance of an RRC procedure for dual connectivity, the MeNB, the SeNB, and/or the WTRU may be configured to synchronize and/or otherwise indicate the completion of the RRC procedure, perhaps for example to begin utilizing a reconfiguration, among other reasons. Embodiments recognize that some behavior may include establishing a known delay for implementing the reconfiguration (e.g., waiting for a configured delay to elapse, where the delay may correspond to or may exceed the latency of the Xn interface between the concerned eNBs). For example, the WTRU may perform a random access procedure on the Uu of the SeNB to indicate the completion of an RRC procedure. For example, the MeNB may signal some form of indication towards the SeNB following reception of the complete message (e.g., Inter-eNB coordination).

Embodiments recognize that using a delay and/or Inter-eNB coordination may enable some form of synchronization across multiple nodes. Embodiments also recognize that such techniques may (e.g., significantly) increase the latency of the RRC procedure, perhaps beyond the legacy requirement of some 20 ms. While using random access may provide an indication to the SeNB that the WTRU is ready to operate with its Uu (e.g., secondary MAC), there might not be a clear indication to the SeNB about the outcome of the (re)configuration. For example, in case of a reconfiguration failure for the secondary MAC instance, the WTRU may have reverted to its old configuration upon failure and/or may initiate a random access procedure to access the SeNB using the older configuration.

The WTRU may perform one or more techniques in order to perform L1/L2 synchronization and/or to verify Uu operation, perhaps for example after a successful reconfiguration. Embodiments contemplate one or more techniques to determine whether and/or not (and perhaps if so, when) the WTRU may provide a capability for the network (e.g., to only MeNB, to only SeNB, and/or to both) to confirm that communication over one, the other, and/or both of the configured Uus may be available for a given WTRU. Embodiments recognize that in legacy systems, the WTRU sent RRC signaling towards the eNB over a Uu associated to that same eNB. Using a Uu associated with the eNB receiving the RRC message may enable L2 synchronization/ L3 synchronization (e.g., completion of the RRC procedure) and/or confirmation that the Uu may be functional using the same transmission. In one or more embodiments, this may be unavailable for one or more cases involving dual connectivity.

Embodiments recognize that whether the corresponding RRC packet data units (PDUs) for RRC messaging is transported by the L2 over the Uu of the MeNB only, over the Uu of the SeNB only, and/or over either Uu interface may impact the robustness of the L3 connectivity to the MeNB (e.g., in terms of radio link monitoring (RLM)/radio link failure (RLF) procedure). Embodiments contemplate that, in scenarios in which a user plane bearer may be mapped to a single Uu interface, among other scenarios, it may be useful to have WTRU behavior that allows recovery of the bearer operation in case of failure of the associated Uu.

Other procedures may include the exchange of state information and/or further interactions between eNBs in the presence of dual connectivity. Embodiments contemplate a counter check procedure. The WTRU may be configured to perform an enhanced counter check procedure, perhaps for example in the presence of dual connectivity (e.g., in order to account for multiple MAC instances, etc.).

For example, the counter check procedure may be used by E-UTRAN to request that the WTRU verify the amount of data sent and/or received on one or more data radio bearers (DRBs). More specifically, the WTRU may be requested to check if, for one or more, or each, DRB, the most significant bits of the COUNT match with the values indicated by E-UTRAN. The procedure may enable E-UTRAN to detect packet insertion by an intruder (e.g., a 'man in the middle').

For dual connectivity, the counter check procedure may be implemented such that that sequencing information for one or more, or all, DRBs (e.g., DRBs associated with only the MeNB, DRBs associated with only to the SeNB, DRBs associated with either/both, etc.) is known by the RRC instance in the MeNB. Embodiments recognize that for a bearer associated to the SeNB but not the MeNB, the MeNB may be unaware of the PDCP state and/or the COUNT value used for such DRB. Embodiments contemplate that the counter check procedure may be modified in the presence of dual connectivity.

Another procedure that may be affected by dual connectivity may be the procedure used to ensure in-sequence delivery of data. For dual connectivity, when multi-flow is supported in the downlink, there may be a performance tradeoff related to the reordering functionality (e.g., typically in RLC, but possibly also in PDCP in case of mobility-related events). For example, there may be a tradeoff between additional latency and additional memory requirements. There may be situations where the WTRU may be configured to manage such a tradeoff, and one or more techniques to this effect the decision making are contemplated. The mechanisms may also take into account effects on the Quality of Service (QoS) of associated bearers.

Embodiments contemplate that one or more other procedures used to convey control information (e.g., L2 control information such as PDCP Status Reports, RLC STATUS PDU, etc.) may be modified to account for dual connectivity. For example, for a bearer configured with downlink multi-flow but perhaps not with uplink multi-flow, there may be an (e.g., perhaps a single) uplink bearer and perhaps a single corresponding L2 (e.g., RLC and/or PDCP) instance in the uplink, which may be located in either of the two eNBs. The WTRU may have an uplink path towards one of the two eNBs, for example perhaps while the WTRU may have L2 control information applicable to an instance in either or both of the two eNBs. In some embodiments, the network may forward some or any L2 control information over the Xn interface to the corresponding instance in the second eNB. Embodiments recognize that this may not be practical in some deployments given the non-ideal nature of the interface between the eNBs. Embodiments contemplate one or more techniques that may ensure that the WTRU is able to transmit a L2 control PDU using the proper Uu interface.

Embodiments recognize that another procedure that may be affected by dual connectivity may be the procedure used to perform mobility between SeNBs, perhaps while the WTRU remains connected to the same MeNB. In the LTE security architecture, E-UTRA may enforce key separation. For example, a WTRU might not use more than one Kenb derived by the same eNB. In other words, a given eNB might not derive a new Kenb from a Kenb provided by another eNB.

The source eNB may derive a Kenb and/or may provide it to the target eNB, perhaps for example, during a X2 handover, and/or perhaps for example if there might not be any available Next Hop (NH)/NH Chaining Counter (NCC) pair (e.g., {NH, NCC} pair). The target eNB may later use the S1 PATH switch request to get a new (e.g., fresh) {NH, NCC} pair from the MME. The target eNB may perform an intra-eNB HO, perhaps for example to activate the keying material obtained from (e.g., directly) the MME, and/or it may wait until the next HO to provide that unused {NH, NCC} pair to the next target eNB.

With dual connectivity, the configuration procedure that adds one or more cells of a SeNB may be modeled from the perspective of security in an architecture where PDCP may be located in one or more, or each, of the eNBs (e.g., in an architecture where the S1-u may terminate in either eNB for a given bearer associated to the concerned eNB). Embodiments contemplate one or more techniques that may enable re-keying upon some of the RRC reconfiguration procedures, for example a reconfiguration that may change the applicable SeNB.

Signaling may be transmitted on resources of a serving cell associated to the MeNB (e.g., initial configuration for the secondary MAC instance and/or for at least one serving cell of a SeNB, a subsequent reconfiguration, etc.) and/or on resources of a serving cell associated to the SeNB (e.g., initial configuration for the secondary MAC instance and/or for at least one serving cell of a SeNB), perhaps for example when a WTRU may receive L3 (e.g., RRC) signaling. The WTRU may transmit a response message (e.g., a reconfiguration complete message) according to the applicable L3/RRC procedure, perhaps for example upon successful completion of a L3/RRC procedure (e.g., initial configuration, reconfiguration, etc.). Such messages may indicate the successful outcome of the procedure from the WTRU to the network.

The MeNB might not consider a procedure to be successful until it has received a message from the WTRU indicating the completion of the RRC procedure, for example in case of a reconfiguration that may modify one or more aspects of a serving cell associated to a SeNB and/or a secondary MAC instance of the WTRU configuration. The SeNB may want to know the outcome of the procedure for its Radio Resource Management (RRM) functionality. By way of illustration, and not for limitation, indicting the status of an ongoing L3 procedure may hereafter be referred to as "L3 synchronization" (e.g., for the coordination of the L3-related function in each of the MeNB, SeNB, and WTRU). The SeNB may determine this information by receiving signaling from the MeNB over Xn (e.g., which may involve latency of Xn) and/or by receiving signaling and/or a transmission directly from the WTRU (e.g., which might not involve Xn latency).

The SeNB may be configured to determine from what time instant the WTRU is ready to operate according to the new reconfiguration. By way of illustration, and not by way of limitation, determining the time at which a WTRU is ready to operate using a given configuration may be hereafter referred to as "L1/L2 synchronization" (e.g., for the coordination of scheduling aspects between the MAC instance in the SeNB and the MAC instance in the WTRU).

In one or more embodiments, the MeNB may host the control entity (e.g. RRC instance) that terminates the signaling protocol (e.g., RRC) towards the WTRU. The WTRU may receive L3 control signaling that may initiate a L3 procedure. Such procedures may impact one or more aspects of the WTRU L1/L2 connectivity and/or synchronization.

For example, one or more procedures may be described for performing L3 synchronization and/or L1/L2 synchronization when SRBs that carry control are terminated at a (e.g., single) eNB. For example, in some architectures, L3 signaling (e.g., including responses and/or complete messages from the WTRU) may be transported at L2 using the Uu of the MeNB (e.g., SRBs over the primary MAC interface).

For example, the WTRU may determine to verify the connectivity of the Uu associated with a given MAC instance. The WTRU may initiate the procedure verifying the connectivity of a Uu interface associated with a given MAC instance, perhaps for example based on one more of: an indication received in an RRC PDU, a configuration aspect and/or type of configuration included in an RRC PDU, an indication on the PDCCH sent from the MeNB, an indication on the PDCCH sent from the SeNB, and/or an indication received in a MAC activation command (e.g., and/or other L2 control signaling), and/or the like.

For example, the WTRU may receive an indication in an RRC PDU that indicates that a configuration corresponding to a Uu interface associated with a given MAC instance is to be verified. The WTRU may determine that the RRC PDU received from the network indicates an initiation of a synchronization procedure with the network. For example, the RRC PDU may include a flag that may provide an indication that one or more of a L3 synchronization and/or a L1/L2 synchronization is to be performed. Such a flag may be applicable to a synchronization procedure for an existing configuration (e.g., using PRACH or SRS) and/or to a new (e.g., fresh) configuration included in the RRC PDU control signaling.

For example, the WTRU may determine to perform one or more of a L3 synchronization and/or a L1/L2 synchronization, perhaps based on an aspect of a received configuration. For example, the WTRU may determine that the RRC PDU including a given configuration includes a dedicated configuration for the synchronization procedure. The WTRU may determine to initiate a synchronization procedure with the network using the provided resources, perhaps for example based on the inclusion of a dedicated configuration for performing synchronization. For example, the RRC PDU may include one or more dedicated PRACH parameters (e.g., rach-ConfigDedicated) and/or one or more dedicated parameters for SRS transmissions (e.g., SoundingRS-UL-ConfigDedicatedAperiodic). Such configuration may additionally include timing information such as an offset and/or a periodic occasion (e.g., and/or possibly also a maximum number of transmissions) for transmission. The dedicated configuration may be used for performing the synchronization.

For example, the WTRU may determine to perform one or more of a L3 synchronization and/or a L1/L2 synchronization, perhaps based on receiving an indication to do so on the PDCCH of the MeNB. For example, the WTRU may receive a PDCCH transmission from the MeNB with a downlink control information (DCI) that indicates that the WTRU perform a synchronization procedure, for example with the SeNB.

For example, the WTRU may decode the PDCCH, perhaps to locate such DCI beginning from the completion of the RRC procedure. Such PDCCH decoding activity may be limited in time. The time period may be configurable. For example, the completion of a RRC procedure may correspond to the time at which the WTRU assembles the RRC PDU corresponding to a response that may be applicable to the completion of the procedure (e.g., a RRC complete message). Such an event may serve as the starting position for the time window for monitoring the PDCCH of the MeNB to attempt to locate a synchronization trigger. For example, the beginning of the window may correspond to the initial transmission (e.g., by HARQ) of such an RRC PDU that completes the procedure. For example, the beginning of the window may correspond to the time at which the WTRU may determine that the transmission by HARQ has completed (e.g. the WTRU receives positive ACK from the MeNB).

The WTRU may determine to initiate a random access procedure, perhaps for example if the WTRU successfully receives DCI on the PDCCH of the MeNB indicating that a synchronization procedure is to be performed. The WTRU may determine this based on the type of the DCI format received (e.g. PDCCH order) and/or based on whether or not the WTRU considers its current uplink time alignment for the concerned MAC instance to be valid. The WTRU may determine that it should use a random access procedure, perhaps for example if the WTRU may determine that it has no valid uplink timing alignment. The WTRU may determine to use another type of transmission such as (e.g., aperiodic) SRS, a PUCCH transmission (e.g., D-SR), and/or the like to initiate synchronization, perhaps for example if the WTRU determines that it has a valid uplink timing alignment. The WTRU may determine what signal to use based on its configuration.

For example, the DCI received on PDCCH may indicate that the synchronization procedure (e.g., random access procedure) may be performed by the secondary MAC instance (e.g., test of Uu connectivity with SeNB). For example, the synchronization procedure (e.g., random access procedure) may be performed on resources of the SeNB (e.g., the WTRU may initiate the procedure for the secondary MAC instance). The WTRU may determine that the synchronization procedure has failed, perhaps for example if the WTRU performs a random access procedure and if the random access procedure is unsuccessful. The WTRU may determine that the synchronization procedure has failed if, for example, no grant for an uplink transmission is received within a certain time window and/or following a maximum number of retransmissions (e.g. if the D-SR procedure is unsuccessful), perhaps for example if the WTRU performs another type of uplink transmission (e.g., D-SR).

The WTRU may determine that there is a problem with the connectivity of the Uu for the secondary MAC instance, perhaps for example if the procedure fails. In such scenarios, among others, the WTRU may perform a recovery procedure such as those described herein.

For example, the WTRU may perform one or more of a L3 synchronization and/or a L1/L2 synchronization, perhaps based on receiving an indication to do so on the PDCCH of the SeNB. For example, the WTRU may receive PDCCH from the SeNB with a DCI that indicates a performance of a synchronization procedure. For example, the completion of a RRC procedure may correspond to the time at which the WTRU assembles the RRC PDU corresponding to a response applicable to the completion of the procedure (e.g., a RRC complete message). Such an event may serve as the starting position for the time window for monitoring the PDCCH of the SeNB to attempt to locate a synchronization trigger. For example, the beginning of the window may correspond to the initial transmission (e.g., by HARQ) of such an RRC PDU that may complete the procedure. For example, the beginning of the window may correspond to the time at which the WTRU may determine that the transmission by HARQ has completed (e.g. the WTRU receives positive ACK from the SeNB).

For example, the WTRU may be configured to assume that a synchronization procedure may follow a L3 procedure (e.g., such as a reconfiguration) that may impact the connectivity of the Uu for the secondary MAC instance. In such scenarios, among others, the WTRU may determine that the synchronization procedure is unsuccessful, perhaps for example if the WTRU has not successfully decoded DCI indicating parameters for the synchronization procedure during the applicable time window. The WTRU may determine that there is a problem with the connectivity of the Uu for the secondary MAC instance. In such scenarios, among others, it may perform a recovery procedure such as described herein.

The WTRU may determine to initiate a random access procedure, perhaps for example if the WTRU successfully receives DCI on the PDCCH of the SeNB indicating that a synchronization procedure may be performed. The WTRU may determine this based on the type of the DCI format received (e.g. PDCCH order) and/or based on whether or not the WTRU considers its current uplink time alignment for the concerned MAC instance to be valid. The WTRU may determine to use a random access procedure, perhaps for example if the WTRU determines that it has no valid uplink timing alignment. The WTRU may determine to use another type of transmission such as (aperiodic) SRS, a PUCCH transmission (e.g., D-SR), and/or the like to initiate synchronization, perhaps for example if the WTRU determines that it has a valid uplink timing alignment. The WTRU may determine what signal to use based on its configuration.

For example, the DCI received on PDCCH may indicate that the synchronization procedure (e.g., random access procedure) may be performed by the secondary MAC instance (e.g., test of Uu connectivity with SeNB). For example, the synchronization procedure (e.g., random access procedure) may be performed on resources of the SeNB (e.g., the WTRU may initiate the procedure for the secondary MAC instance). The WTRU may determine that the synchronization procedure has failed, perhaps for example if the WTRU performs a random access procedure, and if the random access procedure is unsuccessful. The WTRU may determine that the synchronization procedure has failed if, for example, no grant for an uplink transmission is received within a certain time window and/or following a maximum number of retransmissions (e.g. if the D-SR procedure is unsuccessful), perhaps for example if the WTRU performs another type of uplink transmission (e.g., D-SR).

Figure 6:
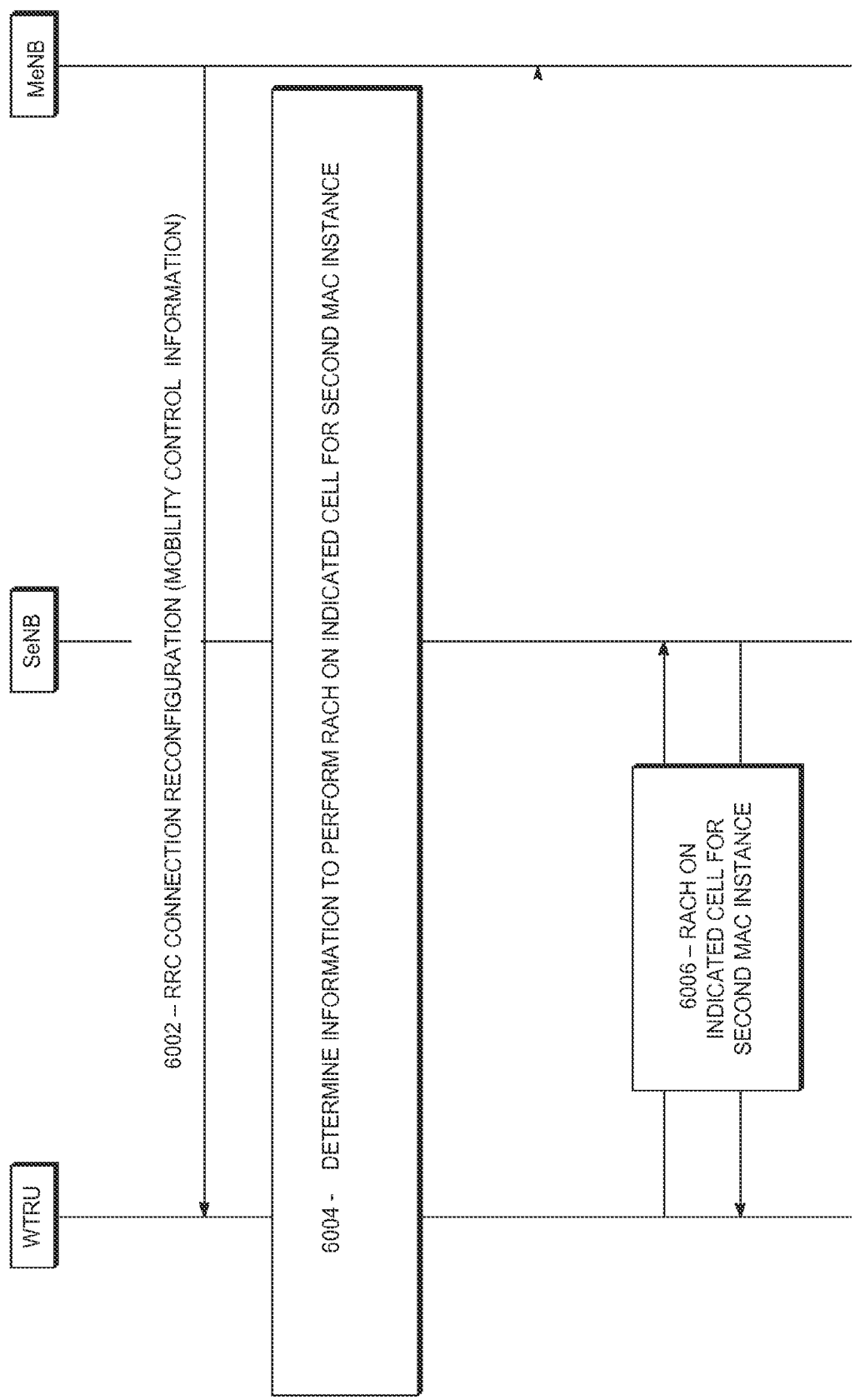
FIG. 6 is an example technique of a configuration of dual connectivity, consistent with embodiments.

FIG. 6 illustrates an example of a configuration/reconfiguration of a dual connectivity between a WTRU and a MeNB and a SeNB. At 6002, a MeNB may send a RRC Connection Configuration/Reconfiguration Message. The RRC Connection Configuration/Reconfiguration Message may include mobility control information for a cell (e.g., serving cell) that may be associated with a second MAC instance for the WTRU (and/or for an updated cell that may be associated with an updated second MAC instance for the WTRU). The mobility control information may or might not provide dedicated RACH (or PRACH) configuration for the cell (and/or updated cell) that may be associated with the second MAC instance for the WTRU.

At 6004, the WTRU may determine, perhaps for example based on the mobility control information (e.g., a mobility control information IE), that the configuration for the second MAC instance is an initial configuration and may reset/configure the MAC for the second instance. The WTRU may determine that the configuration for the second MAC instance is a reconfiguration, perhaps for example based on the mobility control information (e.g., a mobility control information IE). The mobility control information may or might not include RACH (or PRACH) information for the cell that may be associated with the second MAC instance. The RACH (or PRACH) information may include a dedicated RACH (or PRACH) configuration for the cell that may be associated with the second MAC instance.

At 6006, the WTRU may perform a RACH procedure on the cell that may be associated with the second MAC instance, perhaps for example based on if the RACH information is present or absent in the mobility control information. The RACH procedure may include a contention-free RACH process (CFRA), perhaps if the mobility information included the RACH information (e.g., includes the dedicated RACH (or PRACH) configuration for the cell that may be associated with the second MAC instance). The RACH procedure may include a contention-based RACH process (CBRA), perhaps if the mobility information does not include the RACH information (e.g., does not include the dedicated RACH (or PRACH) configuration for the cell that may be associated with the second MAC instance). The WTRU may initiate and/or update the second MAC instance upon a completion of the RACH procedure.

In some embodiments, perhaps where the second MAC instance is being reconfigured, the reconfiguration may include changing/replacing/updating an association of the second MAC instance with a first cell with an association of the second MAC instance with a second cell.

In some embodiments, perhaps where the second MAC instance is being reconfigured, the reconfiguration may include changing/replacing/updating an association of the second MAC instance with a first component of a cell, with an association of the second MAC instance with a second component of the same cell. In other words, updating a cell for the second MAC instance may include updating an association of the second MAC instance with a different component of the same cell.

The WTRU may determine that there is a problem with the connectivity of the Uu for the secondary MAC instance, perhaps for example if the WTRU might not successfully complete the procedure and/or if the procedure fails. For example, such procedural failure may include instances where the WTRU may initiate the procedure but might not successfully complete the procedure. For example, such procedural failure may include instances where the WTRU may be unsuccessful in performing the procedure. This may include failure to initiate the procedure, perhaps for example as a result of a failure to acquire downlink synchronization and/or failure to acquire the Master Information Block (MIB). Failure to acquire downlink synchronization may include failure to acquire the Primary Synchronization Signal (PSS) and/or failure to acquire the Secondary Synchronization Signal (SSS). In such scenarios, among others, it may perform a recovery procedure such as those described herein.

For example, the WTRU may determine to perform one or more of a L3 synchronization and/or a L1/L2 synchronization based on receiving an indication to do so in a MAC activation signal and/or other L2 control signaling. For example, the WTRU may receive a MAC CE from the MeNB that indicates a synchronization procedure (e.g., such as those described herein, for example RACH, D-SR, SRS, and/or the like). Such a MAC CE may be a MAC activation/deactivation control element that activates (or re-activates) at least one serving cell of the WTRU configuration for the secondary MAC instance. For example, the WTRU may determine to perform a synchronization procedure, perhaps independently of whether or not the WTRU considers that it has valid uplink timing alignment. In other words, the combination of successful completion of the RRC procedure followed by the reception of such MAC CE may trigger the synchronization procedure for the secondary MAC instance.

For example, the WTRU may be configured to perform one or more of the described synchronization procedures, perhaps based on whether the previously completed L3/RRC procedure is a procedure that impacts the connectivity of the Uu for the secondary MAC instance. The WTRU may refrain from performing a synchronization procedure, perhaps for example if the L3/RRC procedure affects connectivity to the MeNB but perhaps not to the SeNB. For example, the WTRU may perform the synchronization procedure with the SeNB based on a received RRC reconfiguration modifying one or more of the physical layer and/or of the MAC layer associated to the Uu of the SeNB.

For example, the WTRU may determine to perform one or more of a L3 synchronization and/or a L1/L2 synchronization, perhaps as a function of the L3/RRC procedure. For example, the WTRU may determine that a L3 synchronization procedure and/or a L1/L2 synchronization procedure may be performed based on one or more of: the type of L3 procedure being performed, the impact of the L3 procedure being performed, and/or the initial configuration of the concerned MAC instance and/or cell, and/or the like.

For example, the WTRU may determine that a L3 synchronization procedure and/or a L1/L2 synchronization procedure may be performed based on the type of L3 procedure being performed. The WTRU may determine to perform a synchronization procedure for the secondary MAC instance, perhaps for example if the RRC procedure is a reconfiguration procedure. For example, this determination may include determining whether a RRC reconfiguration message/command includes or does not include mobility control information.

For example, the WTRU may determine that a L3 synchronization procedure and/or a L1/L2 synchronization procedure may be performed based on the impact of the L3 procedure. The WTRU may determine to perform a synchronization procedure for the secondary MAC instance, perhaps for example if the concerned RRC procedure reconfigures at least one aspect of the secondary MAC instance and/or of its associated PHY layer. For example, the synchronization may be performed based on an aspect of the reconfiguration impacting the Uu connectivity of the WTRU via the secondary MAC instance (e.g., synchronization might not be performed if the Uu interface is unaffected by the reconfiguration).

For example, the WTRU may determine to perform a L3 synchronization procedure and/or a L1/L2 synchronization procedure, perhaps based on the initial configuration of the concerned MAC instance and/or cell. The WTRU may determine to perform a synchronization procedure for the secondary MAC instance, perhaps for example if the concerned RRC procedure is a configuration procedure that may initially configure such a MAC instance. Such initial configuration may correspond to the configuration of a MAC instance that was previously not configured, and/or to the configuration of the "special cell" of the concerned MAC instance. For example, the "special cell" may be configured such that it corresponds to a serving cell that was not the "special cell" of the concerned MAC instance before the concerned reconfiguration. The "special cell" may have one or more characteristics that may be similar to the PCell in carrier aggregation for a MAC instance.

For example, the WTRU may receive a RRC Connection Reconfiguration message that adds a first serving cell to a secondary MAC instance. In such scenarios, among others, the WTRU may initiate the synchronization procedure to the SeNB associated with the secondary MAC instance.

For example, uplink multi-flow may be available, for example for data associated with SRBs (e.g., RRC PDUs). The WTRU may determine to perform a synchronization procedure for the secondary MAC instance following the reception of L3/RRC signaling from the MeNB. The WTRU may prepare a L3/RRC message in an RRC PDU, for example in response to the received L3/RRC signaling. Such an RRC PDU may become available for transmission for the applicable SRB. The WTRU may determine to use resources of the secondary MAC instances for the transmission of the RRC PDU, perhaps since the L3/RRC signaling may be applicable to the secondary MAC instance, perhaps for example if the WTRU is configured for uplink multi-flow for the concerned SRB. The WTRU may be configured such that more than one Uu is available for the transmission of L3/RRC signaling, and/or the WTRU may determine how to transport the RRC signaling (e.g., which layer (e.g., MeNB, SeNB, both, etc.) and/or MAC instance may be used), perhaps for example as a function of whether or not synchronization may be performed for one (or both) Uus. The WTRU may perform such transmission using the Uu for which synchronization may have been performed, such that Uu connectivity following the L3 procedure may be confirmed. The WTRU may determine that the L3 response may be transmitted by the Primary MAC instance, perhaps for example if the WTRU determines that more than on Uu may use synchronization as a result of a L3 procedure. For example, a second response message and/or a synchronization procedure may also be initiated by the secondary MAC instance.

While the methods described herein sometimes use the specific example of the L3/RRC Connection Reconfiguration procedure, the techniques described herein may be equally applicable to other L3 procedures. In particular, the techniques may be applicable to procedures that may be applicable to aspects associated to different MAC instances of the WTRU configuration (and/or different aspects associated to different eNBs and/or Uu).

Different types of resources may be used for performing a synchronization procedure. For example, the WTRU may be configured to perform a synchronization procedure on a specific serving cell of a given MAC instance. For example, the serving cell used for synchronization may be a "special cell" or a designated cell of the WTRU configuration (e.g. for the MAC instance associated to the concerned eNB). For example, such serving cell may be a cell with a specific identity (e.g., cell ID/cell index=0 for the MAC associated to the concerned eNB). For example, such a serving cell may be a cell for which the WTRU is configured with uplink resources (e.g., PUUCH and/or PUSCH resources). For example, such serving cell may be a "special cell" of the MAC instance.

The WTRU may initiate the transmission of a Scheduling Request (SR), perhaps for example when the WTRU has determined to perform the synchronization procedure. The WTRU may transmit D-SR, perhaps for example if the WTRU has a valid uplink timing alignment for the timing advance group associated to the applicable serving cell (e.g., the special cell for the secondary MAC instance or the cell used for synchronization) and/or the WTRU has a valid PUCCH configuration for D-SR. In some embodiments, otherwise, the WTRU may perform RACH SR (RA-SR).

The WTRU may initiate a random access procedure, perhaps for example when the WTRU has determined to perform the synchronization procedure. The WTRU may initiate a contention-free random access, perhaps for example if the signaling includes dedicated parameters (e.g. rach-ConfigDedicated). In some embodiments, perhaps otherwise, the WTRU may initiate a contention-based random access. The WTRU may be configured to perform the random access procedure, perhaps for example if it does not have a valid uplink timing alignment for the timing advance group associated to the concerned cell and/or applicable MAC instance. The WTRU may be configured to perform the random access procedure, perhaps for example if the WTRU does not have a valid configuration for a dedicated SRS transmission (e.g. either the SRS is not configured, has been revoked, and/or is not applicable, etc.).

The WTRU may initiate the transmission of SRS, perhaps for example when the WTRU has determined to perform the synchronization procedure. For example, the transmission of SRS may be based on receipt of trigger 1 (e.g., aperiodic SRS). The WTRU may initiate the transmission of an aperiodic SRS, perhaps for example if the signaling includes dedicated parameters (e.g. SoundingRS-UL-ConfigDedicatedAperiodic).

The WTRU may use a random access procedure to test the DL/UL of a reconfigured Uu interface, for example for UL timing synchronization and/or power setting. For example, the WTRU may receive an RRC Connection Reconfiguration message that modifies one or more aspects of a cell associated to a SeNB. For example, the reconfiguration may establish and/or modify a configuration applicable to a PCell and/or a "special cell" of the SeNB. The RRC Connection Reconfiguration message may also include a configuration for a dedicated PRACH transmission. The WTRU may perform the random access procedure (e.g. contention-free), perhaps for example after the reconfiguration of its transceiver functionality. The WTRU may monitor PDCCH of the PCell or "special cell" of the SeNB for a DCI that triggers the random access procedure, possibly during a configurable period of time following the reconfiguration of the SeNB Uu, perhaps for example in scenarios where the RRC Connection Reconfiguration message does not include a configuration for a dedicated PRACH transmission, among other scenarios.

The WTRU may use an aperiodic SRS transmission to test the UL of a reconfigured Uu interface. For example, the WTRU may receive an RRC Connection Reconfiguration message that modifies one or more aspects of a cell associated to a SeNB. For example, the reconfiguration may establish and/or modify a configuration applicable to a PCell and/or a "special cell" associated with the SeNB. The RRC Connection Reconfiguration message may include a configuration for a dedicated SRS transmission. The WTRU may start transmission of SRS in the indicated subframes, perhaps after the reconfiguration of its transceiver functionality, perhaps for example if the WTRU has a valid timing alignment for the timing advance group associated to the concerned cell. The WTRU may be configured to perform up to the maximum number of SRS transmissions. For example, the WTRU may monitor PDCCH for a DCI that triggers the aperiodic SRS transmission subsequent to the reconfiguration of its transceiver functionality, perhaps for example rather than receiving such an indication in the RRC message.

The WTRU may use a periodic SRS transmissions to test the UL of a reconfigured Uu interface. For example, the WTRU may receive an RRC Connection Reconfiguration message that modifies one or more aspects of a cell associated to a SeNB. For example, the reconfiguration may establish and/or modify a configuration applicable to a PCell and/or a "special cell" associated with the SeNB. The RRC Connection Reconfiguration message may include a flag that indicates that the WTRU perform a synchronization procedure. The WTRU may start transmission of SRS following completion of the RRC procedure, perhaps in order to test UL Uu connectivity, perhaps for example if the WTRU has a valid configuration for SRS and/or has a valid timing alignment for the timing advance group associated to the concerned cell.

In one or more embodiments, perhaps for example if the WTRU does not perform synchronization immediately following reconfiguration, the WTRU may later determine to perform such a synchronization procedure, for example as triggered by a scheduling request in case of uplink data arrival and/or a DCI received on the PDCCH. In one or more embodiments, perhaps for example if the WTRU determines that the synchronization procedure using D-SR is not successful, it may further attempt to perform the synchronization procedure using the RA-SR procedure.

The synchronization procedure may indicate the success or failure of an RRC reconfiguration procedure to an eNB/MAC instance that was not involved in the signaling exchange for RRC procedure. For example, the WTRU may select one of a plurality of resources (e.g., in time, frequency, preamble format for PRACH, and/or preamble value for PRACH, and/or the like) and/or of signal types (e.g. SRS, D-SR or PRACH) in order to perform the synchronization procedure. For example, different resources may correspond to a different outcomes for the L3 procedure. The WTRU may transmit a response/complete message using the resources associated with the primary MAC instance perhaps for example, if a L3 procedure reconfigures the Uu associated to the secondary MAC instance. The response may indicate to the primary MAC instance the status (e.g., complete, failure, etc.) of the reconfiguration. The WTRU may perform a synchronization procedure using a first procedure (e.g. a contention-free preamble using resources associated to the secondary MAC instance, for example as supplied in the reconfiguration), perhaps for example if the WTRU is able to comply with the reconfiguration of the Uu of the secondary MAC instance. The WTRU may perform a synchronization procedure using a second procedure (e.g. a contention-based preamble using resources associated to the secondary MAC instance), perhaps for example if the WTRU is unable to comply. The WTRU may use the old configuration for the secondary MAC instance, perhaps for example if the reconfiguration was unsuccessful. The message transmitted during synchronization may be a complete message that may acknowledge the reconfiguration and/or a response message that may negatively acknowledge the reconfiguration.

The MeNB may indicate to the SeNB over Xn that a procedure has completed, perhaps for example when it receives a response message from the WTRU, perhaps for example if the L2 transport of the reconfiguration signaling (e.g., L3/RRC signaling) uses resources associated with the MeNB (e.g., the WTRU receives RRC signaling on a primary MAC instance). In such scenarios, among others, the SeNB may transmit explicit control signaling (e.g., PDCCH) towards the WTRU over its Uu, perhaps for example such that the synchronization procedure may be triggered. For example, the SeNB may be aware of the ongoing RRC procedure from the inter-eNB coordination over Xn. For example, the SeNB may have provided at least part of the RRC configuration supplied to the WTRU via the primary MAC instance of the MeNB. The secondary MAC instance at the SeNB may begin to transmit explicit control signaling (e.g. PDCCH) towards the WTRU over its Uu, perhaps for example such that the synchronization procedure may be triggered and/or may attempt detection of transmissions from the WTRU that correspond to the synchronization procedure, perhaps for example after providing the reconfiguration information to the MeNB.

The SeNB may determine that the transmitted signaling (e.g., the RRC PDU) may trigger synchronization (e.g. L3 and/or a L1/L2 synchronization) between the WTRU and the SeNB, perhaps for example if the L2 transport of the reconfiguration signaling (e.g., L3/RRC signaling) uses resources associated with the SeNB (e.g. the WTRU receives RRC signaling on a secondary MAC instance). The synchronization may be to confirm one or more aspects of the configuration that are applicable to the Uu interface between the WTRU and the SeNB. For example, the MeNB may indicate to the SeNB over Xn that transmitted signaling (e.g., the RRC PDU) should trigger synchronization (e.g., L3 and/or a L1/L2 synchronization) between the WTRU and the SeNB. The SeNB may be configured to determine whether the RRC reconfiguration was successfully performed (e.g., L3 synchronization), perhaps for example based on one or more of the techniques described herein, for example perhaps if the SeNB is able to receive RRC signaling over its Uu interface.

The SeNB may determine that the transmitted RRC PDU (and/or its associated L2 SDU such as a PDCP PDU and/or RLC SDU) was successfully received by the WTRU using hybrid automatic repeat request (HARQ) logic (e.g. a HARQ ACK is received from the WTRU) and/or from RLC/PDCP status reports, perhaps for example if the RRC reconfiguration message was transmitted over the Uu interface of the SeNB. The SeNB may determine that the transmitted RRC PDU (and/or its associated L2 SDU such as a PDCP PDU and/or RLC SDU) was successfully received by the WTRU, perhaps for example based on receiving a transmission of a MAC PDU from the WTRU that may include a SDU for the SRB that corresponds to the initial RRC message from the network. The SeNB may determine that the transmitted RRC PDU (and/or its associated L2 SDU such as a PDCP PDU and/or RLC SDU) was successfully received by the WTRU, perhaps for example based on receipt of an uplink transmission from the WTRU. For example, the uplink transmission may confirm that the connectivity of the Uu interface has been performed (e.g., the transmission may be performed using the updated configuration). For example, the SeNB may receive a preamble (and/or a complete a random access procedure), a SR on PUCCH, a SRS, and/or a PUSCH transmission, and/or the like, for the corresponding WTRU (e.g., subsequent) to the SeNB having determined that the L3/RRC procedure has been initiated. Such UL signaling may indicate that the RRC procedure was successful.

The WTRU may be configured to transmit a response message for a L3 procedure that may be initiated from the reception of a RRC PDU on a resource associated to a SeNB, and/or that may be applicable to a configuration for operation with the SeNB. The SeNB may determine that a reconfiguration has completed successfully from the reception from the WTRU of a transport block associated to a LCH that corresponds to a SRB (e.g., SRB1) and/or to the reception of an additional signal received from the WTRU such as from a synchronization procedure as described herein. The detection of a message for a SRB may indicate that the L3 procedure is ongoing, perhaps for example while the synchronization procedure may indicate the outcome of the L3 procedure and/or confirm Uu connectivity with the WTRU. For example, the SR procedure (e.g. either D-SR, or RA-SR) and/or the reception of SRS signals may serve as the synchronization procedure.

The SeNB may determine that a reconfiguration has completed successfully from the reception of signaling during one or more of the described synchronization procedures, perhaps for example if the WTRU is configured to transmit a response message for a L3 procedure that is applicable to a configuration for operation with the SeNB and/or perhaps if such a response is to be transmitted using resources associated to a primary MAC instance of the WTRU configuration. Receipt of a synchronization signal may confirm Uu connectivity with the WTRU. The SeNB may (e.g., implicitly) determine whether or not the procedure was successful, perhaps for example based on the resource and/or type of signal received from the WTRU.

For any type of L3/RRC procedure, the WTRU may determine that it might not be able to comply with the received configuration. Using RRC configuration as an example (e.g. initial configuration, reconfiguration, etc.), the WTRU may determine that it is unable to comply with (e.g., at least part of) the configuration included in the configuration message sent from the network. The WRTU may indicate that it is unable to comply with one or more aspects of the configuration to one or more of the MeNB and/or the SeNB.

For example, the WTRU may determine how to indicate that it is unable to comply with one or more aspects of the configuration, perhaps for example based on the contents of the L3 configuration message. For example, The WTRU may determine whether or not at least part of the configuration message is applicable to the configuration of the PCell associated to the primary MAC instance. The WTRU may be configured to perform an RRC Connection Re-establishment procedure, perhaps for example if the WTRU is unable to comply with a configuration that is applicable at least in part to the PCell of the primary MAC instance. The WTRU may perform an RRC Connection Re-establishment procedure, perhaps for example if the received configuration is applicable at least in part to any serving cell associated to the primary MAC instance (e.g., including or not including the PCell of the primary MAC instance). The WTRU may continue using the configuration that was used prior to the reception of configuration message, perhaps for example to perform re-establishment. The connection reconfiguration procedure may be considered to be ended, perhaps for example upon initiating the RRC Connection Re-establishment procedure.

The WTRU may perform an alternative procedure (e.g. a notification as described herein) perhaps in order to indicate that it is unable to comply with the reconfiguration of the secondary MAC instance, perhaps for example if the reconfiguration message is applicable to the Secondary MAC instance (e.g., the reconfiguration is applicable to a "special cell" or PCell of a secondary MAC instance). For example, the WTRU may continue using the configuration used prior to the reception of configuration message and/or may apply the configuration (e.g., in-part, if any) that is applicable to the primary MAC instance, and/or may continue using the configuration used prior to the reception of configuration message for the secondary MAC instance.

The WTRU may be configured to determine how to notify the secondary MAC instance of the unsuccessful reconfiguration, perhaps for example based on the nature of the failure. For example, the WTRU may determine how to complete the configuration procedure as a function of the respective outcomes of the procedure as applicable to the primary MAC instance (if any) and/or as applicable to the secondary MAC instance (if any).

The WTRU may be configured to perform a RRC Connection Re-establishment procedure, perhaps for example if the reconfiguration of the primary MAC instance fails. The RRC connection re-establishment may be triggered irrespective of the outcome of the reconfiguration of the secondary MAC instance, perhaps for example upon failure of the reconfiguration of the primary MAC instance. For example, the WTRU may continue using the configuration used prior to the reception of configuration message and/or may initiate the connection re-establishment procedure, upon which the connection reconfiguration procedure may end.

The WTRU may be configured to continue using the configuration used prior to the reception of configuration message for the concerned secondary MAC instance, and/or may apply the configuration for the primary MAC instance (e.g., if applicable), perhaps for example if the reconfiguration of a secondary MAC instance fails, and/or the primary MAC instance was unchanged and/or successfully reconfigured. One or more of the notification procedures described herein may be used to indicate to the network that reconfiguration of the secondary MAC instance was unsuccessful.

The WTRU may perform the RRC Connection Re-establishment procedure, perhaps for example if the WTRU is unable to comply with an aspect of a configuration/reconfiguration procedure. The WTRU may indicate the cause of the re-establishment. The WTRU may set the reestablishmentCause field in the RRCConnectionReestablishmentRequest as follows: the WTRU may set the reestablishmentCause to the value reconfigurationFailure, perhaps for example if the re-establishment procedure was initiated due to reconfiguration failure based on the WTRU being unable to comply with the reconfiguration for the primary MAC instance. The WTRU may set the reestablishmentCause to the value reconfigurationFailureSecondaryMAC-instance, perhaps for example if the re-establishment procedure was initiated due to reconfiguration failure based on the WTRU being unable to comply with the reconfiguration for the secondary MAC instance.

For example, the WTRU may determine that it is unable to comply with, and/or it may not successfully complete, a L3/RRC procedure as applicable at least in part to a secondary MAC instance. The WTRU may notify the network of the outcome.

Using the example of a reconfiguration procedure, the WTRU may use one or more notification messages, perhaps in order to notify the network that reconfiguration of the secondary MAC instance was unsuccessful, perhaps for example if the WTRU is unable to comply with at least part of the reconfiguration, and the part to which it is unable to comply is applicable to the secondary MAC instance, but perhaps not the primary MAC instance.

For example, the WTRU may transmit a notification of the configuration failure as an RRC message. For example, the RRC message notifying the network of the failure may be a response message as part of the RRC Reconfiguration procedure (e.g. RRC Connection Reconfiguration Failure or RRC Connection Reconfiguration Complete with an indication that the WTRU could not comply with (or failed) at least part of the configuration for a secondary MAC). The WTRU may transmit a RRC Reconfiguration Complete message as part of the completion of the RRC Reconfiguration procedure, perhaps for example if the part of the reconfiguration involving the primary MAC instance was successfully performed. A RRC Reconfiguration Complete message may be transmitted by the WTRU, perhaps for example based on the WTRU being able to comply with the configuration for (e.g., substantially) all aspects of the primary MAC instance.

In some embodiments, the WTRU may determine that it was able to comply with a reconfiguration of the primary MAC instance (e.g., either the WTRU was able to comply, or none of the reconfiguration aspects were applicable to the primary MAC instance), and/or the WTRU may determine that it was unable to comply with at least part of a reconfiguration for a secondary MAC instance. In such scenarios, among others, the WTRU may include in a notification that part of the reconfiguration applicable to the secondary MAC instance was unsuccessful in the complete/response message sent to the primary MAC instance and/or the RRC PDU and/or transmission as the complete message applicable to the concerned procedure. For example, the WTRU may use a RRC Connection Reconfiguration Failure and/or a RRC Connection Reconfiguration Complete with an indication that the WTRU could not comply with (or failed) the configuration for at least part of a secondary MAC.

The WTRU may initiate a bearer re-establishment request procedure, perhaps for example upon an unsuccessful reconfiguration of the secondary MAC instance.

The WTRU may perform the SR procedure using dedicated PUCCH resources using resources associated to a secondary MAC instance, perhaps for example in order to perform synchronization after a successful secondary MAC instance reconfiguration and/or provide notifications after an unsuccessful secondary MAC instance reconfiguration. The WTRU may indicate to RRC to release PUCCH/SRS for serving cells associated with the secondary MAC instance, clear any configured downlink assignments and uplink grants for the secondary MAC instance, and/or initiate a Random Access procedure using resources associated to the secondary MAC instance (e.g., using the special cell) and/or cancel pending SRs associated to the secondary MAC instance, perhaps for example if the WTRU reaches the maximum number of D-SR transmission.

The WTRU may determine that it is experiencing UL RLF for the secondary MAC instance, but perhaps not for the primary MAC instance, perhaps for example if the WTRU fails to successfully complete a random access procedure using resources associated to a secondary MAC instance. The secondary MAC instance at the WTRU may report such failure to the RRC layer. In such scenarios, among others, the WTRU may notify the network of the failure, for example using resources of associated to the primary MAC instance.

The WTRU may perform one or more of D-SR, SR and/or Random Access procedure(s), perhaps for example for synchronization during/after a L3/RRC procedure. The WTRU may perform such a synchronization procedure, for example before initiating the transmission of the complete message associated with the L3 procedure. The outcome of the L3 procedure may be impacted by the outcome of the synchronization procedure. For example, this may be the case if the L2 transport of RRC signaling may uses resources associated to the primary MAC instance. The WTRU may determine that the L3/RRC procedure is successful, perhaps for example if the synchronization procedure is successful. The WTRU may initiate the transmission of a complete message, perhaps for example after completion of synchronization with the secondary MAC instance. The WTRU may initiate the transmission of a complete (or failure) message, perhaps with an indication of the negative outcome of the procedure as applicable, perhaps for example if the synchronization procedure is not successful.

The network (e.g. the SeNB) may be configured to determine whether there are radio link problems for a WTRU, perhaps for example based on one or more of: channel quality indicator (CQI) reporting (e.g., if configured and/or requested), reception of HARQ feedback, and/or the number of retransmissions used for a DL transmission, and/or the like. The network (e.g. the SeNB) may be configured to determine whether there are radio link problem(s) for a WTRU, perhaps for example based on one or more of: SRS transmissions (e.g., if configured and/or requested), PUSCH reception, absence of detection of a preamble from the WTRU following a PDCCH order to perform random access, and/or the like. Embodiments recognize that such network based RLM may lead to additional delay during which the WTRU may be unable to perform and/or receive transmissions via the secondary MAC instance.

The WTRU may perform radio link monitoring for at least one cell (e.g. the "special cell" or PCell) of its secondary MAC instance, perhaps for example if the WTRU is allowed to receive L3 signaling (e.g., SRB data such as RRC PDUs) using any of its primary and/or secondary MAC instances. The WTRU might not perform radio link monitoring for a cell of the secondary MAC instance (e.g., may not evaluate the secondary MAC instance for RLF), perhaps for example if the WTRU is allowed to receive L3 signaling (e.g., SRB data such as RRC PDUs) using its primary MAC instance but perhaps not its secondary MAC instance. This may be a configuration aspect of the WTRU secondary MAC instance. The WTRU may determine UL RLF for a secondary MAC instance, perhaps for example if the WTRU is allowed to transmit L3 signaling (e.g., SRB data such as RRC PDUs) on its secondary MAC instance and/or may be configured to refrain from evaluating UL RLF for the secondary MAC instance if SRB data is not transmitted on the secondary MAC instance.

The WTRU may perform radio link monitoring for at least one cell (e.g. the special cell or PCell) of its secondary MAC instance, perhaps for example if the WTRU is allowed to transmit user plane data (DRB data) using resources associated to its secondary MAC instance and/or at least some of the data is configured to be transmitted using the secondary MAC instance and not the primary MAC instance. This may be a configuration aspect of the WTRU secondary MAC instance. The WTRU may determine UL RLF for a secondary MAC instance, perhaps for example if the WTRU is allowed to transmit L3 signaling (e.g., SRB data such as RRC PDUs) on its secondary MAC instance and/or may be configured to refrain from evaluating UL RLF for the secondary MAC instance, perhaps for example if SRB data is not transmitted on the secondary MAC instance. The WTRU may determine DL RLF as consequence, perhaps for example if the WTRU performs radio link monitoring for at least one cell of the secondary MAC instance. The WTRU may notify the network according to one or more of the techniques described herein, perhaps for example if the WTRU determines DL RLF and/or UL RLF for a secondary MAC instance.

In one or more embodiments, at least one EPS bearer associated to a secondary MAC instance may be re-associated to a primary MAC instance. Such procedure may be applicable, perhaps for example if data for the concerned EPS bearer may be transmitted using resources of the primary MAC instance and/or resources of the secondary MAC instance (e.g. multi-flow is applicable for the bearer, but the network re-associates such a bearer to a given MAC instance such as the primary MAC instance during the procedure). One or more EPS bearers currently configured for transmission using resources associated to the secondary MAC instance but perhaps not resources associated to the primary MAC instance may be re-associated to the primary MAC instance, perhaps for example if a reconfiguration fails for a secondary MAC instance.

For example, a procedure during which a bearer re-association takes place may include a "RRC connection reconfiguration" procedure that may be modified to support bearer re-association functionality. Such procedure may be initiated by the network, perhaps for example as a result of determining that the WTRU is moving out of coverage of the cell of the secondary MAC instance. The network may initiate the procedure by sending a RRC message such as "RRCConnectionReconfiguration". Such a procedure may include a newly defined (e.g., heretofore undefined) procedure such as a "DRB re-establishment request" that may have been initiated by the WTRU, perhaps for example as a result of detection of radio link problems and/or failure in the secondary MAC instance. As part of such procedure, the network may send a RRC message containing information for the re-association of the bearer to the primary MAC instance.

The WTRU may re-associate one or more EPS bearers from a secondary MAC instance to a primary MAC instance, perhaps for example upon reception of an RRC message containing the re-association information for a given bearer. The WTRU may determine that an EPS bearer is to be re-associated, perhaps for example based on the contents of the RRC message and/or its existing configuration. The WTRU may determine that an EPS bearer is to be re-associated, perhaps for example based on the EPS bearer identity ("eps-BearerIdentity") being included in an information element (IE). For example, the IE may be a "DRB-ToAddMod" and/or "DRB-ToTransfer" that may be part of an IE defining the configuration for a primary MAC instance and/or the EPS bearer identity being part of the existing radio bearer configuration of the WTRU in the secondary MAC instance.

The WTRU may perform at least one of the following actions on the corresponding DRB, perhaps for example when an EPS bearer is to be re-associated. For example, the WTRU may determine that the initial configuration for this DRB corresponds to the configuration of the DRB associated to the EPS bearer in the existing configuration. The WTRU may re-establish PDCP and/or perform the associated status reporting, perhaps for example if configured to do so according to a PDCP configuration (e.g., in case "statusReportRequired" is set to true). The WTRU may apply a ciphering algorithm and/or key used by RBs associated with the primary MAC instance. The WTRU may apply a ciphering algorithm and/or key derived from parameters "keyChangeIndicator" and "nextHopChainingCount", perhaps for example if such parameters were provided in the RRC message re-associating the bearer.

The WTRU may update the KeNB key, perhaps for example if the WTRU updates the ciphering algorithm and/or key based on the received parameters (e.g., for the purpose of horizontal or vertical key derivation), based on one or more of: the stored KeNB and/or NCC (nextHopChainingCount) parameters used for the primary MAC instance, perhaps along with the PCI and E-ARFCN associated to the PCell of the primary MAC instance; and/or the stored KeNB and NCC parameters used in one of the primary MAC instance or the secondary MAC instance, perhaps along with PCI and E-ARFCN associated to the Pcell of the one MAC instance. The selected MAC instance may be the one for which the NCC parameter is the largest.

The WTRU may be configured to re-establish RLC for a bearer being re-associated to a different MAC instance. The WTRU may be configured to reconfigure the PDCP entity, the RLC entity, and/or the DTCH (dedicated traffic logical channel) in accordance with the received "pdcp-Config", "rlc-Config" and "logicalChannelConfig", respectively, for a bearer being re-associated to a different MAC instance, perhaps for example if one or more of these are included in the IE establishing the re-association. The WTRU may be configured to re-assign the logical channel identity in accordance with the received "logicalChannelIdentity", perhaps for example if included in the IE that re-associates the bearer to a different MAC instance. The WTRU may be configured to re-assign the DRB identity in accordance with the received "drb-Identity", perhaps for example if included in the IE that re-associates the bearer to a different MAC instance.

For example, the WTRU may be configured to initiate a procedure for the purpose of notifying the network that it has lost connectivity to a secondary MAC instance and/or requesting that bearers associated to the secondary MAC instance be re-associated to the primary MAC instance. By way of illustration, and not by way of limitation, such a procedure may be referred to as a "DRB re-establishment request."

The WTRU may initiate the DRB re-establishment request procedure, perhaps for example based on detection of radio link failure in the secondary MAC instance. The WTRU may use a variety of methods to detect RLF in the secondary MAC instance. The WTRU may start a timer, perhaps for example upon initiating a reconfiguration (e.g., a synchronized reconfiguration procedure and/or upon detecting physical layer problems in the secondary MAC instance. The WTRU may determine that radio link failure has occurred in the secondary MAC instance, perhaps for example upon an expiration of the timer. Detection of physical layer problems may occur, perhaps for example upon reception of a configured number of out-of-sync indications for a specific cell (e.g. Pcell or special cell) of the secondary MAC instance.

The WTRU may be configured to determine that radio link failure has occurred for a secondary MAC instance, perhaps for example based on detection of random access problems from the secondary MAC instance. The WTRU may declare radio link failure for the secondary MAC instance, perhaps for example if random access attempts are unsuccessful for a given number of random access attempts and/or over a predetermined period of time. The WTRU may declare radio link failure for the secondary MAC instance, perhaps for example based on detecting random access problems at a cell of the secondary MAC instance, perhaps while timers T300, T301, T304 and/or T311 are not running.

The WTRU may be configured to determine that radio link failure has occurred for a secondary MAC instance, perhaps for example based on an indication from the RLC that the maximum number of retransmissions has been reached for one or more logical channels associated with the secondary MAC instance.

The WTRU may initiate transmission of a "DRB re-establishment request" message, perhaps for example upon detecting a RLF associated with the secondary MAC instance. The WTRU may include one or more items of information in the DRB re-establishment request. For example, the DRB re-establishment request may include a measurement report that includes measurement results for one or more of the serving cells/frequencies associated with transmissions for the secondary MAC instance. For example, the DRB re-establishment request may include any and/or all available measurement results for the secondary MAC instance. For example, the DRB re-establishment request may include an indication of the condition that triggered initiation of the procedure (e.g., a "Cause"). For example, the DRB re-establishment request may include an indication that the trigger for the DRB re-establishment procedure includes one or more of: physical layer problems, random access problems, reaching a maximum number of retransmissions on a logical channel (e.g., possibly the identity of the logical channel and/or associated DRB(s) and/or EPS bearer(s)), and/or a cause similar to those described for sending "notifications" to the network that a L3 synchronization has failed, and/or the like.

The WTRU may be configured to utilize a fallback reconfiguration, perhaps for example in order to fallback to a primary MAC instance. For example, a WTRU may be configured to send data (e.g., user data and/or control signaling) for a given radio bearer over a secondary MAC instance. In some protocol architectures, at the network-side the RLC entity corresponding to this radio bearer may be terminated at the SeNB and/or the PDCP entity corresponding to this radio bearer may be terminated at the MeNB. The radio bearer may correspond to a data radio bearer (DRB) and/or a signaling radio bearer. The WTRU may lose connectivity with the network, perhaps for example upon detection of a radio link failure condition associated with the secondary MAC instance, and/or perhaps for example if some or all signaling radio bearers are mapped to the secondary MAC instance. The WTRU may perform one or more of the techniques described herein, in any combination, for example to prevent the WTRU from losing connectivity with the network (e.g., in the event of a RLF being detected on the secondary MAC instance).

The WTRU may suspend the secondary MAC instance configuration, perhaps for example upon detecting RLF associated with the secondary MAC instance. The WTRU may maintain the WTRU secondary MAC instance in an inactive state, perhaps for example while suspended and/or perhaps while attempting to correct the radio problems via the primary MAC instance and/or a different secondary MAC instance. For example, the WTRU may release the secondary MAC instance configuration and/or may clear any outstanding RLC PDUs of RLC instances mapped to the released MAC instance. The WTRU may be configured to re-establish PDCP of bearers that were configured with secondary MAC instance and/or may suspend the PDCP bearers that were configured with secondary MAC instance. The PDCP bearers may be suspended, perhaps for example if they are not allowed to be remapped to a second secondary (and/or a primary) MAC instance.

The WTRU may be configured to reconfigure (e.g., remap) one or more radio bearers that are mapped to a secondary MAC instance for which RLF has been detected (e.g., such as one or more signaling radio bearers) for transmission over the primary MAC instance. Reconfiguring one or more radio bearers mapped to a secondary MAC instance for which RLF has been detected may be referred to as "fallback reconfiguration" by way of illustration and not limitation. The fallback radio bearer configuration implemented during fallback reconfiguration of a secondary MAC instance may have been provided in advance (e.g., pre-configured) by higher layers for one or more, or each, bearer, such as at the time the bearer was initially configured for dual connectivity operation. For example, the fallback configuration may correspond to a pre-defined default configuration. The set of bearers for which fallback reconfiguration may apply may be configured by RRC. In case RLC entities corresponding to the fallback reconfiguration were already created prior to the fallback reconfiguration, the WTRU may re-establish these RLC entities at the time of reconfiguration, perhaps for example to take into account changes in bearer configuration due to the fallback reconfiguration, among other reasons.

The WTRU may be configured to suspend transmission of data radio bearers, perhaps for example upon detecting RLF for a secondary MAC instance and/or upon applying a fallback reconfiguration. The WTRU may suspend one or more data radio bearers mapped to the secondary MAC instance, perhaps for example upon detecting RLF for a secondary MAC instance. The WTRU may include outstanding UL data for the reconfigured radio bearers as available for transmission in the primary MAC instance, perhaps for example for the purpose of buffer status reporting and logical channel prioritization. The WTRU may consider the UL data associated with suspended bearers as available for transmission via the primary MAC instance (and/or a secondary MAC instance that has not been suspended), perhaps for example after suspending data radio bearer transmission over a secondary MAC instance. The WTRU may trigger transmission of a buffer status report (BSR) for the primary MAC instance, perhaps for example during the fallback reconfiguration. The WTRU may trigger transmission of a scheduling request, for example via the primary MAC instance (and/or a secondary MAC instance that has not been suspended), perhaps for example as a result of triggering the BSR and/or applying a fallback reconfiguration. For example, the WTRU may initiate an RRC procedure such as a DRB re-establishment request, a report of radio link failure, and/or a measurement report, perhaps for example in order to indicate that a fallback reconfiguration is being requested and/or implemented.

In the examples described herein, the WTRU may use one or more different procedures for determining when RLF has occurred for a secondary MAC instance. For example, the conditions for detecting a radio link failure in a secondary MAC instance may correspond to a subset and/or all of the conditions described herein for determining that RLF has occurred.

For example, the WTRU may utilize a dynamic bearer-to-MAC instance mapping, perhaps for example when implementing a fallback reconfiguration. For example, a WTRU may be configured to send data (e.g., user data via one or more DRBs and/or control signaling via one or more SRBs) for a radio bearer over one or more secondary MAC instances and/or a primary MAC instance. In some protocol architectures, at the WTRU side there may be an RLC entity mapped to one or more, or each, MAC instance associated with the bearer. There may be corresponding peer RLC entities on the network side at the MeNB and/or SeNB. The WTRU may submit a PDCP PDU of a given radio bearer to one of the RLC entities (e.g., and perhaps one or more of the MAC instances), perhaps for example based on various criteria and/or triggers. For example, there may be no restriction on which RLC entity/MAC instance is used for transmission for a particular piece of data mapped to the radio bearer.

The WTRU may be configured to map the PDCP PDU to the RLC entity mapped to the first (e.g., in time) MAC instance that is able to include at least part of the PDCP PDU in a transport block, perhaps as part of logical channel multiplexing/prioritization procedure, perhaps for example if there are no restrictions on which RLC entity/MAC instance is used for transmission of a PDCP PDU.

For example, the WTRU may determine the RLC entity/MAC instance to use for a given PDCP PDU in advance (e.g., prior to the submission of the PDCP PDU to lower layers by the PDCP entity). For example, the predetermined the RLC entity/MAC instance to use for a given PDCP PDU may be selected based on estimated throughput for the RLC entities/MAC instances and/or link quality associated with the RLC entities/MAC instances. The PDCP PDUs associated with the data may be included as available UL data of the determined/mapped MAC instance, perhaps for example if the data is mapped to a specific RLC entity/MAC instance, and perhaps for example for the purpose of buffer status reporting and/or logical channel prioritization.

The RLC entity/MAC instance to which a PDCP PDU is submitted may be restricted to a specific RLC entity/MAC instance, perhaps for example at a given time. For example, one or more techniques may be used for selecting which specific entity is to be used to carry a given PDCP PDU at a given instance in time. For example, the determination of which RLC entity/MAC instance to use may be provided by physical layer signaling (e.g., indicated in the UL grant on the PDCCH, E-PDDCH, etc.), and/or higher layer (e.g., RRC) signaling. For example, the WTRU may receive an RRC message indicating the RLC entity/MAC instance for a given bearer. For example, the WTRU may receive a MAC control element from a MAC instance in the network that identifies one or more bearers that may be carried using the RLC entity corresponding to the MAC instance that transmitted the MAC CE. For example, the MAC CE may indicate an RLC entity corresponding to a different MAC instance may be used for transmitting the bearer.

The determination of which RLC entity/MAC instance to use at a given instance of time may be determined based on observed conditions at the WTRU. For example, for a data of a given bearer, the WWTRU may determine that a first RLC entity/MAC instance may be used (e.g., at all times) unless a radio link failure condition is detected with respect to that MAC instance. A second RLC entity/MAC instance may be used, perhaps for example if the radio link failure condition is detected. The first and/or second RLC entities may be explicitly configured by higher layers, for example on a per-radio bearer basis.

For example, which RLC entity/MAC instance to use for transporting given data in the case of RLF detection on the MAC instance that may be used for transporting the data may be determined (e.g., implicitly) at the WTRU. For example, the second RLC entity/MAC instance (e.g., the MAC instance to use when the usual MAC instance for the data is experience RFL or is otherwise unavailable) may correspond to a primary MAC instance. The WTRU may default to utilizing the primary MAC instance to communicate data, perhaps for example if the MAC instance experiencing RLF is a secondary MAC instance. For example, the primary MAC instance may be used as the fallback MAC instance for failure on a secondary MAC instance.

For example, the WTRU may take various actions when the RLC/MAC instance changes for a given bearer. For example, the RLC MAC instance may change when RLF is detected, for example RLF being detected for a secondary MAC instance. The data for a radio bearer (e.g., regularly) mapped to the secondary MAC instance may instead be provided to an RLC entity associated with a different MAC instance, perhaps for example when RLF is detected for a secondary MAC instance. The WTRU may include outstanding UL data for the bearer(s) as available for transmission in the new (e.g., fresh/updated) MAC instance for logical channel prioritization and/or buffer status reporting, perhaps for example upon changing the RLC entity/MAC instance used to transmit the data for one or more radio bearer(s). The WTRU may trigger transmission of a buffer status report in the new (e.g., remapped) MAC instance, perhaps for example upon changing the RLC entity/MAC instance used to transmit the data for one or more radio bearer(s). The WTRU may be triggered to transmit a scheduling request corresponding to the (e.g., remapped) MAC instance, perhaps for example based on the updated BSR. The WTRU may include a MAC control element in a MAC PDU sent to the new (e.g., fresh/updated) MAC instance at the network side that indicates that the bearer is now using the remapped MAC instance and/or associated RLC entity, perhaps for example upon changing the RLC entity/MAC instance used to transmit the data for one or more radio bearer(s). For example, an RRC message may be transmitted to indicate the change in RLC entity/MAC instance mapping, perhaps rather than or in addition to, a MAC CE.

A WTRU configured for dual connectivity may receive a CounterCheck message and/or may perform the counter check procedure to take into account the dual connectivity. For example, the WTRU may implement a MAC instance-specific and/or eNB-specific counter check procedure. The WTRU may determine whether the procedure is applicable to all DRBs or to a subset of DRBs, perhaps for example upon receiving a CounterCheck message. The WTRU may determine whether the procedure is applicable to DRBs of a specific MAC instance (and/or to DRBs associated to a specific eNB).

The WTRU may determine that the counter check procedure applies to a subset of DRBs, perhaps for example based on the SRB identity over which the WTRU has received the message. The WTRU may determine to consider DRBs that correspond to the concerned MAC instance and/or perhaps not DRBs associated with other MAC instances, for example if there is a SRB (e.g., SRB ID=3) specific to control signaling applicable to a given MAC instance (e.g., a secondary MAC instance). The WTRU may determine using a similar technique what DRB identity space to use for the counter check procedure in cases where the counter check procedure may be MAC-specific.

For example, the WTRU may determine that the counter check procedure applies to a subset of DRBs, perhaps for example based on the contents of the counter check request message. For example, the counter check request message may include an explicit indication (or identity) of the MAC instance (e.g., if the DRB identity space is MAC-specific). The WTRU may determine that the counter check procedure applies to a subset of DRBs, perhaps for example based on the identity of the Uu interface on which the WTRU received the counter check request message. For example, the WTRU may determine to perform the counter check procedure for the MAC instance associated with Uu interface over which the counter check request message was received. For example, the WTRU may determine that the counter check request message applies to one or more, or all, DRBs irrespective of the MAC instance that they may be associated with.

For example, the WTRU may assume that counter check requests apply to the DRBs associated with the primary MAC instance, but perhaps not to DRBs associated with a secondary MAC instance. For example, the WTRU may receive an indication in the counter check request message of which MAC instance the counter check procedure may be performed for and/or may apply the counter check to DRBs associated with the indicated MAC instance.

The WTRU may utilize MAC instance-specific and/or eNB-specific counter check signaling, perhaps for example in order to complete a counter check procedure. The WTRU may determine whether the procedure is applicable to one or more, or all DRBs, or to a subset of DRBs, perhaps for example based on the type of signaling (e.g., whether the signaling is specific to a given MAC instance and/or its associated DRBs), perhaps for example upon receiving the CounterCheck message. For example, a dual connectivity counter check procedure may include the transmitting eNB (e.g., eNB issuing the counter check) determining sequencing information for one or more, or all DRBs (e.g., both MeNB and SeNB). Such information may be gathered by the transmitting eNB (e.g., the MeNB), perhaps for example in order to assemble the RRC message (e.g., counter check request) for transmission. DRBs associated with the SeNB may be suspended prior to preparing the counter check request, perhaps for example to ensure the MeNB is aware of the relevant sequencing. For example, the counter check procedure may be split between the MeNB and the SeNB and/or (e.g., a single) eNB/MAC instance may issue the request on behalf of both nodes. For example, the SeNB may generate the counter check message to be forwarded to the WTRU via the MeNB. The MeNB may or might not supplement and/or alter the message, perhaps for example to take into account DRBs at the primary MAC instance. The MeNB could interpret the results, perhaps for example taking into account information provided by the SeNB and/or may provide the response from the WTRU to the SeNB for evaluation.

A moving window (and/or a timer) may be used for the reordering function, perhaps for example to mitigate latency for downlink data reception. For example, the moving window and/or timer may be implemented such that stalling may be avoided during reordering. Such a window (and/or timer) may be configurable, for example via RRC. The WTRU may report information pertaining to buffer occupancy to the network, perhaps for example to reduce buffering requirements for downlink data reception. For example, the WTRU may provide an indication to the network when the distance between the SN of the last received PDCP PDU is greater than the PDCP SN of the oldest outstanding PDCP PDU in the WTRU buffer (or in the WTRUs PDCP receive window, if any) by a specified threshold (e.g., possibly configurable value and/or a value related to WTRU capabilities). For example, the WTRU may provide an indication to the network when the distance between the SN of the last received PDCP PDU is greater than the SN of the first missing PDCP PDU by the specified threshold. The WTRU may generate the indication and/or send it to one or more of the eNBs, perhaps for example when the WTRU determines that its buffer occupancy has reached a threshold. The indication may be a PDCP control PDU such as a PDCP Status Report. For example, the indication may be sent as a MAC Control Element. For example, the priority associated with such a buffer indication may be higher than its associated LCH/LCG, such that for example such control information may trigger a BSR and/or a SR.

The WTRU may be configured with a logical channel (LCH) associated to a specific MAC instance (and/or to a specific eNB). Such a LCH may be associated with an EPS bearer. At least one EPS bearer may be associated to more than one LCH, for example one for each MAC instance (and/or specific eNB), perhaps for example in case of downlink multi-flow but perhaps not uplink multi-flow.

The WTRU may transmit L2 control information, perhaps for example while operating with dual connectivity. Examples of L2 control information may include RLC STATUS PDUs and/or a PDCP STATUS REPORTs. For example, a LCH that is not associated with RLC/PDCP in the UL may utilize a "special" or limited purpose UL LCH for reporting of control information, perhaps for example even if data is not sent for the LCH in the uplink For example, the WTRU may be configured such that the uplink direction of a LCH associated with a MAC instance (and/or eNB) is disabled for user data traffic. The WTRU may use the LCH, perhaps for example if L2 control information (e.g. RLC STATUS PDU, PDCP STATUS REPORT, etc.) is available for transmission for the concerned LCH. In such scenarios, among others, the WTRU may transmit the data in the uplink perhaps for example without instantiating a corresponding RLC instance for the uplink LCH, at least not for user plane data. The WTRU may transmit the data in the uplink, perhaps for example without instantiating a corresponding PDCP instance for the uplink LCH, at least not for user plane data. The WTRU may consider the LCH as a DRB for the purpose of reset and/or re-establishment, perhaps for example in case of a mobility event and/or of a re-establishment event applicable to such a LCH. The WTRU may consider the LCH for the purpose of buffer status reporting (BSR) (e.g., RLC STATUS PDU, PDCP STATUS REPORT, etc.), and/or the L2 control information may be considered as data available for transmission for such a LCH.

For example, a logical channel without a RLC instance and/or PDCP instance in the UL may utilize a MAC CE for transport of L2 control information. For example, the WTRU may use a MAC CE to carry L2 control information for the MAC instance for which the EPS bearer may have no associated LCH for the uplink The WTRU may consider such a MAC CE for the purpose of buffer status reporting (BSR) and/or Scheduling Request (SR). For example, an RLC STATUS PDU, a PDCP STATUS REPORT, and/or other L2 control information that is to be carried as a MAC CE may be considered as data available for transmission for the purpose of SR triggering and/or the trigger for such a MAC CE may itself directly trigger a SR for the concerned MAC instance.

The WTRU may be configured to re-key one or more security functions, perhaps for example upon an RRC Connection Reconfiguration procedure that changes the configuration for a SeNB (e.g., SeNB mobility). For example, the WTRU may receive L3/RRC signaling that reconfigures one or more aspects of the secondary MAC instance and/or of the Uu associated to a secondary MAC instance. Such signaling may add, modify, and/or remove one or more bearers in the WTRU configuration. Such signaling may reconfigure the WTRU such that the secondary MAC instance and/or the Uu are associated to a different SeNB.

Such SeNB to SeNB mobility may trigger and/or imply intra-MeNB mobility for re-keying purposes. For example, L3/RRC signaling that reconfigures one or more aspects of the secondary MAC instance and/or of the Uu associated to a secondary MAC instance may include mobility control information that may trigger an intra-eNB handover such that re-keying may occur for the security context associated to the primary instance (and/or to the MeNB).

MeNB security may re-key based on fresh $K_{ASME}$, and/or SeNB may re-key based on the NCC. For example, the WTRU may receive an RRC Connection Reconfiguration that triggers mobility for the secondary MAC instance (and/or for bearers associated to a SeNB). Such signaling may also include a mobilityControlInformation IE applicable to the primary MAC instance (and/or for bearers associated to the MeNB) for the purpose of an intra-eNB mobility event. For example, for the purpose of re-keying and/or updating the applicable security keys, signaling applicable to the primary MAC instance (and/or for bearers associated to the MeNB) may include the keyChangeIndicator set to false in the securityConfigHO. Such signaling may trigger the WTRU to update the $K_{eNB}$ key for the primary MAC instance, perhaps for example based on the fresh $K_{ASME}$ key taken into use with the previous successful NAS SMC procedure. Signaling applicable to the secondary MAC instance (and/or for bearers associated to the SeNB) may include the keyChangeIndicator set to true in the securityConfigHO. The signaling may trigger the WTRU to update the $K_{eNB}$ key for the primary MAC instance, perhaps for example based on the current $K_{eNB}$ or the NH, using the nextHopChainingCount value indicated in the securityConfigHO.

For example, the SeNB security may re-key based on fresh $K_{ASME}$, and the MeNB may re-key based on NCC. For example, the key derivation for the secondary MAC instance may follow keyChangeIndicator set to false while the key derivation for the primary MAC instance may follow keyChangeIndicator set to true. For example, the WTRU may receive an RRC Connection Reconfiguration that triggers mobility for the secondary MAC instance (and/or for bearers associated to a SeNB). Such signaling may also include a mobilityControlInformation IE applicable to the primary MAC instance (and/or for bearers associated to the MeNB) for the purpose of an intra-eNB mobility event. Signaling applicable to the primary MAC instance (and/or for bearers associated to the MeNB) may include the keyChangeIndicator set to true in the securityConfigHO, perhaps for example for the purpose of re-keying and/or updating the applicable security keys, among other reasons. Such signaling may trigger the WTRU to update the $K_{eNB}$ key for the primary MAC instance, perhaps for example based on the current $K_{eNB}$ and/or the NH, perhaps using the nextHopChainingCount value indicated in the securityConfigHO. Signaling applicable to the secondary MAC instance (and/or for bearers associated to the SeNB) may include the keyChangeIndicator set to false in the securityConfigHO. The signaling may trigger the WTRU to update the $K_{eNB}$ key for the secondary MAC instance, perhaps for example based on the fresh $K_{ASME}$ key taken into use with the previous successful NAS SMC procedure.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A first base station comprising a processor configured to:
transmit a radio resource control (RRC) message, the RRC message indicating whether packet data convergence protocol (PDCP) protocol data units (PDUs) of a data radio bearer are to be transmitted using one or more of a first uplink (UL) path or a second UL path;
receive a first PDCP PDU of the data radio bearer using the first UL path, the first UL path being associated with a first radio link control (RLC) configuration associated with a first cell; and
receive the first PDCP PDU of the data radio bearer using the second UL path, the second UL path being associated with a second RLC configuration associated with a second cell.

2. The first base station of claim 1, wherein the first UL path is associated with a first medium access control (MAC) instance, and the second UL path is associated with a second MAC instance.

3. The first base station of claim 2, wherein the first MAC instance is associated with transmissions to the first base station and the second MAC instance is associated with transmissions to a second base station.

4. The base station of claim 3, wherein the first MAC instance is established based on first MAC configuration information, and the second MAC instance is established based on second MAC configuration information.

5. The base station of claim 1, wherein the first UL path is associated with a first RLC entity established based on first RLC configuration information, and the second UL path is associated with a second RLC entity established based on second RLC configuration information.

6. A method implemented by a first base station, the method comprising:
transmitting a radio resource control (RRC) message to a wireless transmit/receive unit, the RRC message indicating whether packet data convergence protocol (PDCP) protocol data units (PDUs) of a data radio bearer are to be transmitted using one or more of a first uplink (UL) path or a second UL path;
receiving a first PDCP PDU of the data radio bearer using the first UL path, the first UL path being associated with a first radio link control (RLC) configuration associated with a first cell; and
receiving the first PDCP PDU of the data radio bearer using the second UL path, the second UL path being associated with a second RLC configuration associated with a second cell.

7. The method of claim 6, wherein the first UL path is associated with a first medium access control (MAC) instance, and the second UL path is associated with a second MAC instance.

8. The method of claim 7, wherein the first MAC instance is associated with transmissions to the first base station and the second MAC instance is associated with transmissions to a second base station.

9. The method of claim 8, wherein the first MAC instance is established based on first MAC configuration information, and the second MAC instance is established based on second MAC configuration information.

10. The method of claim 6, wherein the first UL path is associated with a first RLC entity established based on first RLC configuration information, and the second UL path is associated with a second RLC entity established based on second RLC configuration information.

11. A base station comprising a processor configured to:
transmit a radio resource control (RRC) message, the RRC message indicating restriction information for transmission of packet data convergence protocol (PDCP) protocol data units (PDUs) of a data radio bearer, wherein the restriction information indicates that a first rule is to be applied for transmission of the PDCP PDUs when a condition is not detected by a wireless transmit/receive unit (WTRU) and that a second rule is to be applied for transmission of the PDCP PDUs when the condition is detected by the WTRU;
receive a first PDCP PDU of the data radio bearer using a first UL path in accordance with the first rule, the first UL path being associated with a first radio link control (RLC) configuration associated with a first cell; and receive a second PDCP PDU of the data radio bearer using a second UL path in accordance with the second rule, the second UL path being associated with a second RLC configuration associated with a second cell.

12. The base station of claim 11, wherein the first rule indicates that the PDCP PDUs of the data radio bearer are to be transmitted using the first UL path.

13. The base station of claim 11, wherein the second rule indicates that the PDCP PDUs of the data radio bearer are to be transmitted using either the first UL path or the second UL path.

14. The base station of claim 11, wherein the condition comprises a radio link failure condition.

15. The base station of claim 11, wherein the condition comprises an amount of data available for transmission.

16. A method implemented by base station, the method comprising:

transmitting a radio resource control (RRC) message, the RRC message indicating restriction information for transmission of packet data convergence protocol (PDCP) protocol data units (PDUs) of a data radio bearer, wherein the restriction information indicates that a first rule is to be applied for transmission of the PDCP PDUs when a condition is not detected by a wireless transmit/receive unit (WTRU) and that a second rule is to be applied for transmission of the PDCP PDUs when the condition is detected by the WTRU;

receiving a first PDCP PDU of the data radio bearer using a first UL path in accordance with the first rule, the first UL path being associated with a first radio link control (RLC) configuration associated with a first cell; and receiving a second PDCP PDU of the data radio bearer using a second UL path in accordance with the second rule, the second UL path being associated with a second RLC configuration associated with a second cell.

17. The method of claim 16, wherein the first rule indicates that the PDCP PDUs of the data radio bearer are to be transmitted using the first UL path.

18. The method of claim 16, wherein the second rule indicates that the PDCP PDUs of the data radio bearer are to be transmitted using either the first UL path or the second UL path.

19. The method of claim 16, wherein the condition comprises a radio link failure condition.

20. The method of claim 16, wherein the condition comprises an amount of data available for transmission.

\* \* \* \* \*